United States Patent
Yamaji

(10) Patent No.: US 7,934,111 B2
(45) Date of Patent: Apr. 26, 2011

(54) APPARATUS AND METHOD FOR ALLOWING QUICK ACTIVATION OF ELECTRONIC EQUIPMENT, AND RECORDING MEDIUM HAVING A PROGRAM STORED THEREON FOR PERFORMING SUCH METHOD

(75) Inventor: Hidenori Yamaji, Tokyo (JP)

(73) Assignee: Sony Corporation (JP)

( * ) Notice: Subject to any disclaimer, the term of this patent is extended or adjusted under 35 U.S.C. 154(b) by 661 days.

(21) Appl. No.: 12/005,078

(22) Filed: Dec. 21, 2007

(65) Prior Publication Data

US 2008/0162970 A1  Jul. 3, 2008

(30) Foreign Application Priority Data

Dec. 28, 2006  (JP) ................................ P2006-355746

(51) Int. Cl.
*G06F 1/32* (2006.01)
(52) U.S. Cl. ........................................ 713/324; 713/323
(58) Field of Classification Search .................... 713/323
See application file for complete search history.

(56) References Cited

U.S. PATENT DOCUMENTS

| 6,079,025 | A  | * | 6/2000 | Fung ............................ 713/323 |
| 6,920,573 | B2 | * | 7/2005 | Lee ............................. 713/323 |
| 7,096,472 | B2 |   | 8/2006 | Machida et al. |
| 7,100,062 | B2 | * | 8/2006 | Nicholas ....................... 713/323 |
| 7,137,019 | B2 | * | 11/2006 | Hellerstein et al. ........... 713/323 |
| 7,237,133 | B2 | * | 6/2007 | Aoki ............................ 713/324 |
| 7,401,244 | B2 | * | 7/2008 | Hellerstein et al. ........... 713/323 |
| 7,428,644 | B2 | * | 9/2008 | Jeddeloh et al. .............. 713/300 |
| 7,437,579 | B2 | * | 10/2008 | Jeddeloh et al. .............. 713/300 |
| 7,484,111 | B2 | * | 1/2009 | Fung ............................ 713/320 |
| 7,702,940 | B2 | * | 4/2010 | Van Gassel et al. ........... 713/324 |
| 2004/0260957 | A1 | * | 12/2004 | Jeddeloh et al. .............. 713/300 |
| 2005/0018473 | A1 | * | 1/2005 | Aoki ............................ 365/154 |
| 2008/0313482 | A1 | * | 12/2008 | Karlapalem et al. ........... 713/324 |
| 2009/0292934 | A1 | * | 11/2009 | Esliger ........................ 713/323 |

FOREIGN PATENT DOCUMENTS

JP   2002-157132 A   5/2002

OTHER PUBLICATIONS

Tanenbaum, Andrew S.; "Structured Computer Organization"; Prentice-Hall, Inc.; 1990; Third Edition; pp. 11-13.*

* cited by examiner

*Primary Examiner* — Ryan M Stiglic
(74) *Attorney, Agent, or Firm* — Lerner, David, Littenberg, Krumholz & Mentlik, LLP

(57) ABSTRACT

An information processing apparatus transitions from an active state, in which processing according to an application program is executed, to a paused state due to a predetermined trigger, and transitions from the paused state to the active state due to another trigger different from the predetermined trigger, and includes: a usage rate calculating section calculating a usage rate of a main memory, when transition is made from the active state to the paused state; a paused state selecting section selecting a paused state to which transition is to be made from among a plurality of kinds of the paused state, on the basis of a usage rate of the main memory calculated by the usage rate calculating section; and a paused state transition section transitioning itself to a paused state selected by the paused state selecting section.

7 Claims, 27 Drawing Sheets

FIG. 7

|  | HOST CPU | SDRAM | EMBEDDED CONTROLLER (RTC) |
|---|---|---|---|
| ACTIVE STATE S0 | ON | ON | ON |
| SUSPEND STATE S3 | OFF | ON | ON |
| HIBERNATION S4 SOFT-OFF STATE S5 | OFF | OFF | ON |
| MECHANICAL OFF STATE G3 | OFF | OFF | OFF (RTC RETAINED) |

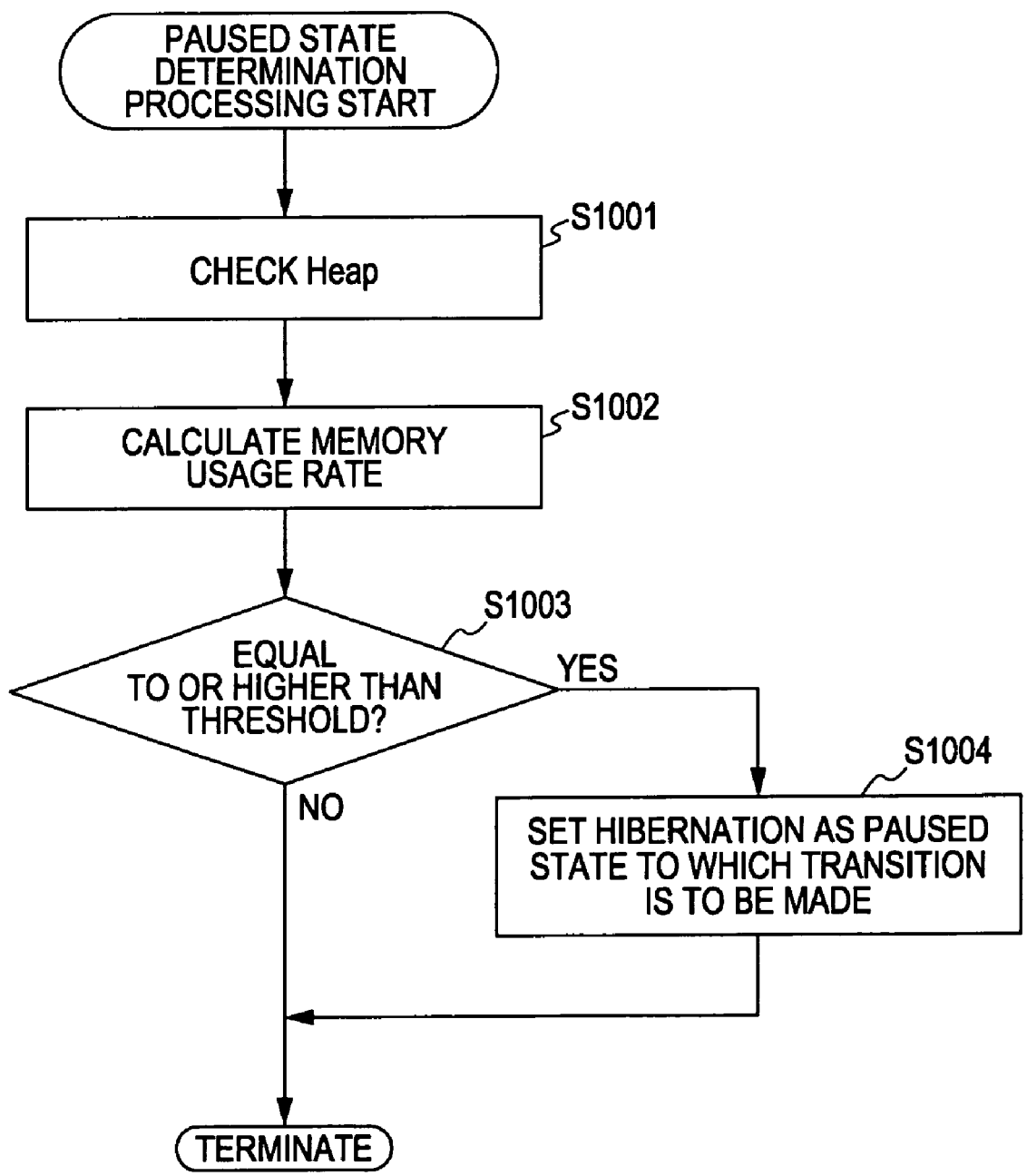

APPARATUS AND METHOD FOR ALLOWING QUICK ACTIVATION OF ELECTRONIC EQUIPMENT, AND RECORDING MEDIUM HAVING A PROGRAM STORED THEREON FOR PERFORMING SUCH METHOD

CROSS-REFERENCE TO RELATED APPLICATIONS

The present application claims priority from Japanese Patent Application No. JP 2006-355746, filed in the Japanese Patent Office on Dec. 28, 2006, the entire content of which is incorporated herein by reference.

BACKGROUND OF THE INVENTION

1. Field of the Invention

The present invention relates to an information processing apparatus and method, a program, and a recording medium. More specifically, the present invention relates to an information processing apparatus and method, a program, and a recording medium which make it possible to activate electronic equipment quickly to provide enhanced usability for the user.

2. Description of the Related Art

In the related art, electronic equipment such as a personal computer is installed with a so-called suspend/resume function, whereby a state immediately before terminating a computer is temporarily stored so that operation can be immediately resumed when the computer is booted up again.

In particular, CE (Consumer Electronics) equipment such as a digital still camera adopts a system in which, in order to ensure that the equipment becomes operable immediately after activation, electric power is continued to be supplied to a memory such as RAM even after power OFF is commanded by the user, so that a suspend/resume is repeated without performing a shut down or reboot every time activation or termination is done.

However, when a suspend/resume is repeated, data held in a memory such as RAM may be erroneously updated, or destructed, leading to malfunction of equipment. For example, if there is a bug in an application program installed in a computer, a situation may arise in which although processing of the application program is terminated, the storage area within the memory that the application program has secured is not freed, so the available storage area within the memory decreases gradually. If this so-called memory leak occurs, a situation may arise in which, after a resume, the capacity of the memory becomes short, and so the computer does not operate properly.

To avoid such a situation, in a personal computer according to the related art, for example, by performing a shut down or reboot at the time of termination or activation, a program is loaded again to a memory such as RAM at the time when activation is performed, thereby making it possible to continue proper computer processing.

Further, there is also proposed a configuration in which, by utilizing a memory protection function that the OS has, in a single-processor system for processing multiple jobs, exclusive control is performed at the user process level safely and efficiently without any dedicated instruction (see, for example, Japanese Unexamined Patent Application Publication No. 2002-157132).

SUMMARY OF THE INVENTION

However, for CE equipment such as a digital still camera, it is desirable to avoid performing a shut down or reboot as much as possible except when it is absolutely necessary, such as when a built-in battery has been detached or firmware has been updated.

This is due to the following reason. That is, activation of high-performance, high-functionality, and large-scale operating systems such as linux (registered trademark) used in recent digital still cameras generally takes a long time as compared with the activation of small-scale operating systems such as μITRON (micro industrial the real-time operating system nucleus). Further, when processing executed by an application such as connection to the GUI or network becomes sophisticated, the application program becomes large-scale, and more time is required for its activation. Therefore, if a shut down or reboot is performed every time CE equipment such as a digital still camera activates or deactivates, this presumably impairs usability for the user.

Accordingly, once a memory leak or the like occurs in a digital still camera or the like, the probability of the actual occurrence of a situation where the memory capacity becomes short and the computer does not operate properly becomes extremely high.

It is thus desirable to operate electronic equipment in a stable manner, and also enhance usability for the user by allowing quick activation of the electronic equipment.

An information processing apparatus according to an embodiment of the present invention relates to an information processing apparatus which transitions from an active state, in which processing according to an application program is executed, to a paused state due to a predetermined trigger, and transitions from the paused state to the active state due to another trigger different from the predetermined trigger, including: usage rate calculating means for calculating a usage rate of a main memory, when transition is made from the active state to the paused state; paused state selecting means for selecting a paused state to which transition is to be made from among a plurality of kinds of the paused state, on the basis of a usage rate of the main memory calculated by the usage rate calculating means; and paused state transition means for transitioning itself to a paused state selected by the paused state selecting means.

A configuration can be adopted in which the plurality of kinds of the paused state include at least a first paused state and a second paused state, and in the first paused state, supply of power to a processor is stopped and supply of power to the main memory is performed, and in the second paused state, supply of power to the processor is stopped and supply of power to the main memory is stopped.

A configuration can be adopted in which if a usage rate of the main memory is equal to or higher than a preset threshold, the paused state selecting means selects the second paused state as a paused state to which transition is to be made.

A configuration can be adopted in which when transition is made from the second paused state to the active state due to the other trigger, data corresponding to software executed by the processor in the active state is loaded to the main memory again.

A configuration can be adopted in which the information processing apparatus further includes storage means for storing preset data irrespective of presence/absence of supply of power, and when transition is made from the second paused state to the active state due to the other trigger, data corresponding to a memory image of the main memory in the active state stored in the storage means is loaded to the main memory.

An information processing method according to an embodiment of the present invention relates to an information processing method for an information processing apparatus which transitions from an active state, in which processing according to an application program is executed, to a paused state due to a predetermined trigger, and transitions from the paused state to the active state due to another trigger different from the predetermined trigger, including the steps of: calculating a usage rate of a main memory, when transition is made from the active state to the paused state; selecting a paused state to which transition is to be made from among a plurality of kinds of the paused state, on the basis of the calculated usage rate of the main memory; and transitioning itself to the selected paused state.

A program according to an embodiment of the present invention relates to a program for an information processing apparatus which transitions from an active state, in which processing according to an application program is executed, to a paused state due to a predetermined trigger, and transitions from the paused state to the active state due to another trigger different from the predetermined trigger, the program being readable by a computer, including the steps of: controlling calculation of a usage rate of a main memory, when transition is made from the active state to the paused state; controlling selection of a paused state to which transition is to be made from among a plurality of kinds of the paused state, on the basis of the calculated usage rate of the main memory; and controlling itself so as to transition to the selected paused state.

According to an embodiment of the present invention, when transition is made from the active state to the paused state, a paused state to which transition is to be made is selected from among a plurality of kinds of the paused state, on the basis of the calculated usage rate of the main memory, and the self state is caused to transition to the selected paused state.

According to the present invention, it is possible to operate electronic equipment in a stable manner, and also enhance usability for the user by allowing quick activation of the electronic equipment.

BRIEF DESCRIPTION OF THE DRAWINGS

FIG. 7 is a diagram illustrating states of a digital still camera;

FIG. 27 is a flow chart illustrating an example of paused state determination processing.

DESCRIPTION OF THE PREFERRED EMBODIMENTS

Before describing an embodiment of the present invention, the correspondence between the features of the present invention and an embodiment(s) described in the specification or drawings is discussed below. This description is intended to assure that an embodiment(s) supporting the present invention are described in the specification and drawings. Thus, even if an embodiment described in the specification or drawings is not described as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

An information processing apparatus according to an embodiment of the present invention relates to an information processing apparatus which transitions from an active state, in which processing according to an application program is executed, to a paused state due to a predetermined trigger, and transitions from the paused state to the active state due to another trigger different from the predetermined trigger, including: usage rate calculating means (for example, a host CPU 11 in FIG. 1 executing the processing of step S1002 in FIG. 27) for calculating a usage rate of a main memory, when transition is made from the active state to the paused state; paused state selecting means (for example, a host CPU 11 in FIG. 1 executing the processing of steps S1003 and S1004 in FIG. 27) for selecting a paused state to which transition is to be made from among a plurality of kinds of the paused state, on the basis of a usage rate of the main memory calculated by the usage rate calculating means; and paused state transition means (for example, a host CPU 11 in FIG. 1 executing the processing of steps S503 to S513 in FIG. 23) for transitioning itself to a paused state selected by the paused state selecting means.

Figure 23:
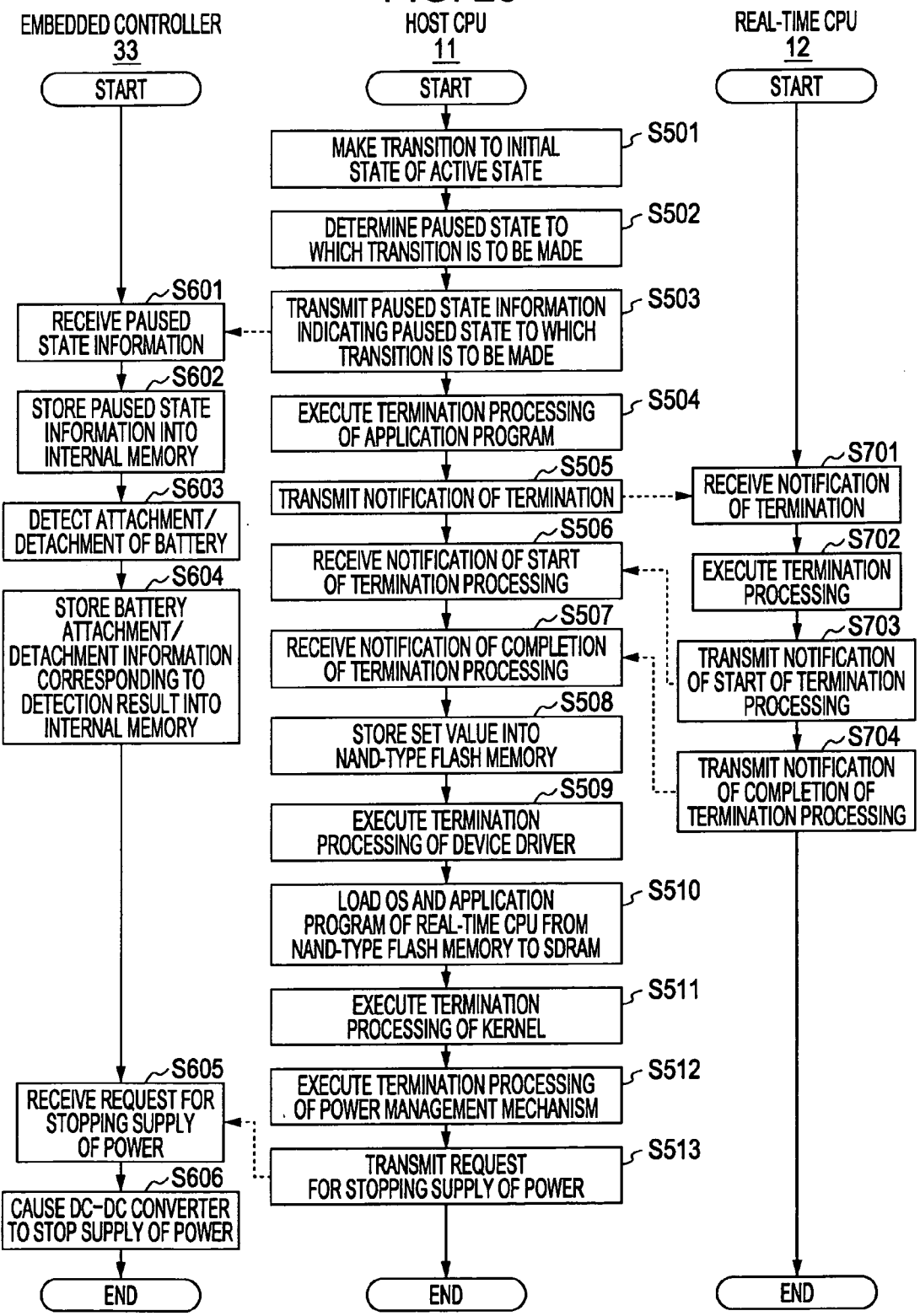
FIG. 23 is a flow chart illustrating an example of pause processing.

An information processing method according to an embodiment of the present invention relates to an information processing method for an information processing apparatus which transitions from an active state, in which processing according to an application program is executed, to a paused state due to a predetermined trigger, and transitions from the paused state to the active state due to another trigger different from the predetermined trigger, including the steps of: calculating a usage rate of a main memory, when transition is made from the active state to the paused state (for example, the processing of step S1002 in FIG. 27); selecting a paused state to which transition is to be made from among a plurality of kinds of the paused state, on the basis of the calculated usage rate of the main memory (for example, the processing of steps S1003 and S1004 in FIG. 27); and transitioning itself to the selected paused state (for example, the processing of steps S503 to S513 in FIG. 23).

Embodiments of the present invention will now be described with reference to the drawings.

Figure 1:
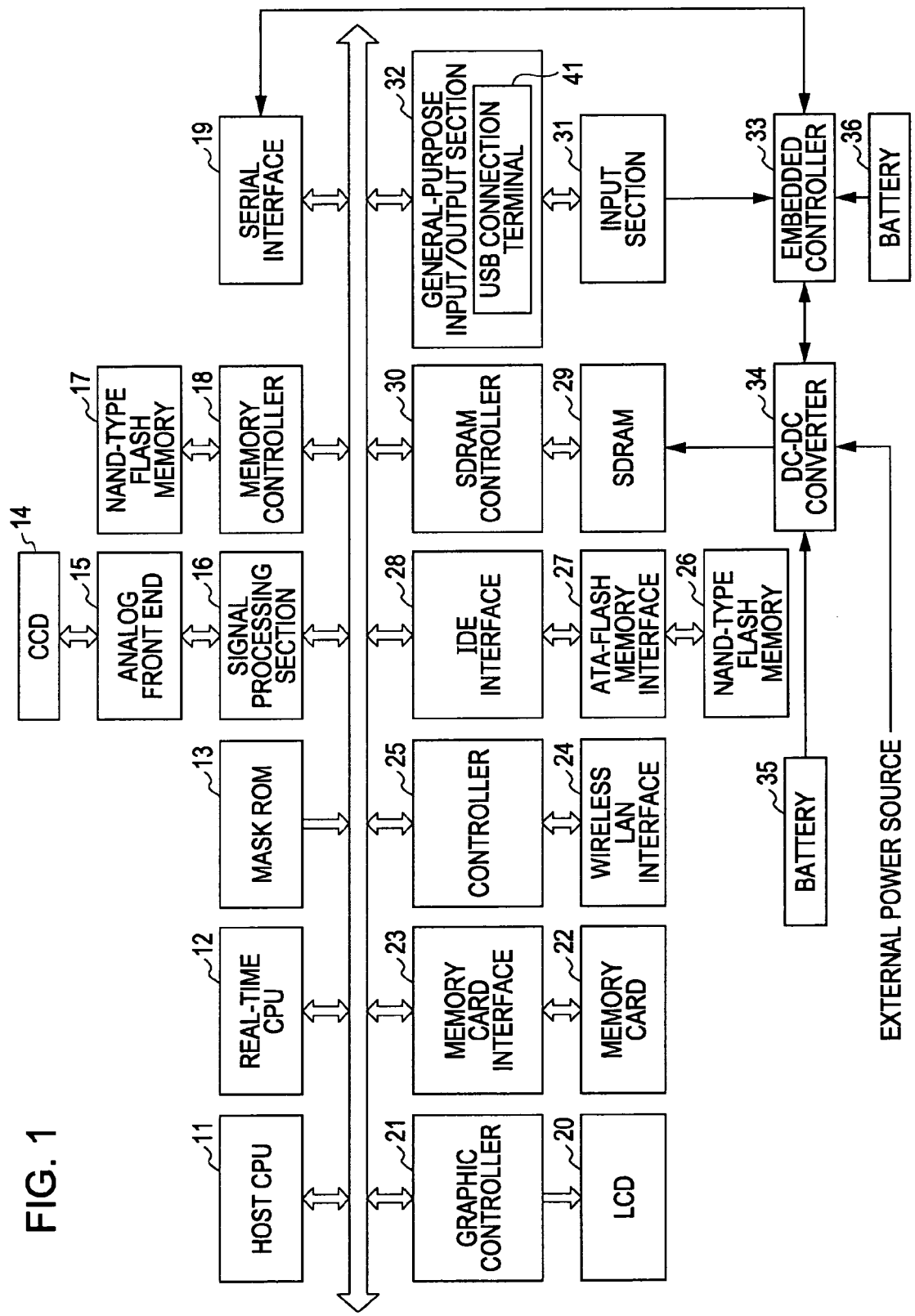
FIG. 1 is a block diagram showing the configuration of a digital still camera as an example of an information processing apparatus according to an embodiment of the present invention.

FIG. 1 is a block diagram showing the configuration of a digital still camera as an example of an information processing apparatus according to an embodiment of the present invention. The digital still camera includes a host CPU 11, a real-time CPU 12, a mask ROM (read only memory) 13, a CCD (charge coupled device) 14, an analog front end 15, a signal processing section 16, a NAND-type flash memory 17, a memory controller 18, a serial interface 19, an LCD (liquid crystal display) 20, a graphic controller 21, a memory card 22, a memory card interface 23, a wireless LAN (local area network) interface 24, a controller 25, a NAND-type flash memory 26, an ATA (AT attachment)-flash memory interface 27, an IDE (integrated device (drive) electronics) interface 28, an SDRAM (synchronous dynamic random access memory) 29, an SDRAM controller 30, an input section 31, a general-purpose input/output section 32, an embedded controller 33, a DC (direct current)-DC converter 34, a battery 35, and a battery 36.

The host CPU 11, the real-time CPU 12, the mask ROM 13, the signal processing section 16, the memory controller 18, the serial interface 19, the graphic controller 21, the memory card interface 23, the controller 25, the IDE interface 28, the SDRAM controller 30, and the general-purpose input/output section 32 are connected to each other via a bus.

The host CPU 11 is configured by an embedded CPU or general-purpose CPU. The host CPU 11 executes an operating system and an application program, and performs GUI processing or the like for performing various kinds of setting, such as the size of an image to be photographed, the compression ratio of image data, or exposure or shutter speed with respect to the digital still camera.

The real-time CPU 12 is configured by an embedded CPU or general-purpose CPU. The real-time CPU 12 executes an operating system and an application program separately from the host CPU 11 to perform real-time processing for controlling the individual sections of the digital still camera, or the like.

The mask ROM 13 stores data unique to the digital still camera, and a boot loader executed by the host CPU 11 at the time of activation.

It should be noted that the term activation as used herein includes not only activation from a state in which supply of power is stopped, but also so-called "resume", that is, activation from a suspend state, hibernation, or a soft-off state. The mask ROM 13 may store a secondary boot loader together with a boot loader.

The CCD 14 is a so-called image sensor. The CCD 14 is interconnected to the analog front end 15. The CCD 14 outputs to the analog front end 15 an analog signal corresponding to the image of a subject formed on its photosensitive part by an optical system (not shown). A CMOS sensor as an image sensor may be provided instead of the CCD 14.

The analog front end 15 is interconnected to the CCD 14 and the signal processing section 16. The analog front end 15 applies predetermined processing such as noise removal to the analog signal corresponding to a subject image from the CCD 14, thereby converting the analog signal into a digital signal. The analog front end 15 supplies the digital signal corresponding to a subject image, which is obtained by the conversion, to the signal processing section 16.

The signal processing section 16 applies predetermined processing such as white balance processing or encoding processing to the digital signal corresponding to a subject image which is supplied from the analog front end 15. The signal processing section 16 supplies the data corresponding to a subject image, which is obtained through application of the predetermined processing, to the NAND-type flash memory 26 via the bus, the IDE interface 28, and the ATA-flash memory interface 27, or to the memory card 22 via the bus and the memory card interface 23.

The NAND-type flash memory 17 is an example of a non-volatile storage medium, and is interconnected to the memory controller 18. The NAND-type flash memory 17 stores a program to be executed by the host CPU 11 or data required for the execution of the program, and also stores a program to be executed by the real-time CPU 12 or data required for the execution of the program.

Further, the NAND-type flash memory 17 stores an image for activation from hibernation to an active state. The program and data that are previously loaded to the SDRAM 29 during the active state of the digital still camera serve as the data of the image stored in the NAND-type flash memory 17 as it is. When the image stored in the NAND-type flash memory 17 is loaded to the SDRAM 29, the SDRAM 29 becomes loaded with the program and data corresponding to those in the active state of the digital still camera.

While the image stored in the NAND-type flash memory 17 will be described below as the image of the program and data executed by the host CPU 11, the image stored in the NAND-type flash memory 17 may be the image of the program and data executed by the host CPU 11 and the image of the program and data executed by the real-time CPU 12.

Further, hereinafter, the image stored in the NAND-type flash memory 17 will be also referred to as warm-boot image.

The memory controller 18 controls reading of a program, data, or warm-boot image from the NAND-type flash memory 17. Further, the memory controller 18 controls writing of various kinds of data such as a warm-boot image into the NAND-type flash memory 17.

The serial interface 19 performs serial communication between the host CPU 11 and the embedded controller 33.

The LCD 20 displays various kinds of image, text, or the like on the basis of control of the graphic controller 21 interconnected to the LCD 20. The graphic controller 21 controls display of the LCD 20.

The memory card 22 is configured by, for example, a MEMORY STICK (registered trademark). The memory card 22 has a non-volatile storage medium built therein, and can be inserted into and drawn out from the digital still camera. When fitted in the digital still camera, the memory card 22 is electrically connected with the memory card interface 23. The memory card interface 23 controls the storage of data into the fitted memory card 22 or reading of data from the memory card 22.

The wireless LAN interface 24 conforms to the IEEE (institute of electrical and electronic engineers) 802.11a, b, or g, and communicates with an access point or other such equipment. The controller 25 interconnects the wireless LAN interface 24 and the bus, and controls the wireless LAN interface 24.

The NAND-type flash memory 26 is an example of a non-volatile storage medium, and stores various kinds of data, such as image data, on the basis of control of the ATA-flash memory interface 27. The ATA-flash memory interface 27 is an interface between the IDE interface 28 and the NAND-type flash memory 26. The ATA-flash memory interface 27 conforms to the ATA standard and communicates with the IDE interface 28. The IDE interface 28 conforms to the IDE standard, and performs communication with the ATA-flash memory interface 27. The NAND-type flash memory 26 is connected to the bus via the ATA-flash memory interface 27 and the IDE interface 28, so the host CPU 11 can control the NAND-type flash memory 26 by using a command in the IDE standard with respect to a hard disk or an optical disk drive.

The SDRAM 29 is an example of a memory medium. The SDRAM 29 is interconnected to the SDRAM controller 30, and stores the operating system and the application program that are executed by the host CPU 11, and the operating system and the application program that are executed by the real-time CPU 12. The host CPU 11 executes the operating system and the application program stored in the SDRAM 29. Further, the real-time CPU 12 executes the operating system and the application program stored in the SDRAM 29.

It should be noted that the SDRAM 29 is endowed with a so-called self-refresh function whereby the SDRAM 29 refreshes its stored data (including a program) by itself when supplied with power.

The SDRAM controller 30 controls writing of a program or data into the SDRAM 29, and controls reading of a program or data from the SDRAM 29.

The input section 31 is configured by a power button, a wireless LAN button, a USB (universal serial bus) button, a switch for detecting the opening/closing of a lens cap (lens shutter), a cross key, a touch panel, or the like. The input section 31 supplies to the general-purpose input/output section 32 and the embedded controller 33 a signal corresponding to the depression of the power button, wireless LAN button, or USB button, a signal corresponding to the opening/closing of the lens cap, or a signal corresponding to an operation on the cross key, touch panel, or the like.

The general-purpose input/output section 32 is a general-purpose serial or parallel input/output interface, and supplies data corresponding to the signal corresponding to the depression of the power button, wireless LAN button, or USB button, the signal corresponding to the opening/closing of the lens cap, or the signal corresponding to an operation on the cross key, touch panel, or the like, which is supplied from the input section 31, to the host CPU 11 or the real-time CPU 12.

Further, the general-purpose input/output section 32 includes a USB connection terminal 41 for connection to USB-compliant equipment or cable.

It should be noted that, although not shown, when the other terminal of a cable whose one end is connected to equipment such as a personal computer is connected to the USB connection terminal 41, the general-purpose input/output section 32 supplies to the embedded controller 33 a signal indicating that equipment has been connected to the USB connection terminal 41.

The embedded controller 33 is a so-called embedded-type CPU, and executes a program stored in a built-in ROM or RAM. On the basis of a signal supplied from the input section 31, the embedded controller 33 controls the reset of the host CPU 11 or cancellation thereof in accordance with the depression of the power button, wireless LAN button, or USB button, or the opening/closing of the lens cap.

The embedded controller 33 controls the supply of power to the individual sections of the digital still camera by the DC-DC converter 34.

The DC-DC converter 34 converts a voltage supplied from the battery 35 as a DC voltage power source or an external power source and, on the basis of control of the embedded controller 33, supplies power (electric power) of a predetermined voltage to the individual sections of the digital still camera or stops supply of power on a section-by-section basis.

The battery 35 is a secondary battery that can be attached to and detached from the digital still camera. The battery 35 supplies electric power for driving the entire digital still camera via the DC-DC converter 34.

The battery 36 is a primary battery such as a button battery. The battery 36 supplies electric power for operating the embedded controller 33 when no electric power is supplied from an external power source or the battery 35.

Next, description will be given of programs executed by the host CPU 11, programs executed by the real-time CPU 12, or programs executed by the embedded controller 33.

In the following description of programs, the processing performed by a computer executing a program will be also expressed as being executed by that program.

Figure 2:
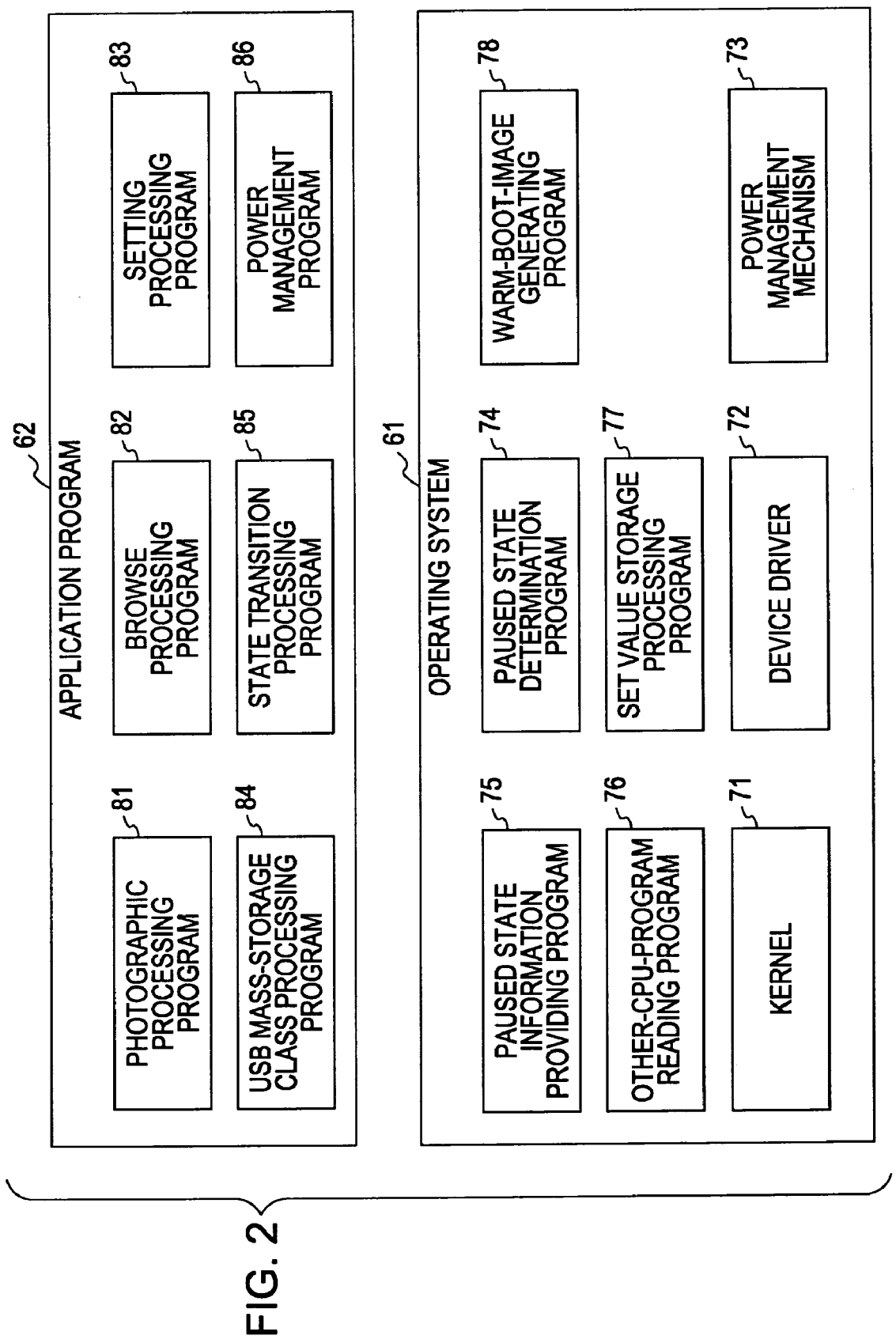
FIG. 2 is a block diagram showing the configuration of an operating system and an application program that are executed by a host CPU.

First, referring to FIG. 2, an operating system 61 and an application program 62 that are executed by the host CPU 11 will be described.

The host CPU 11 executes the operating system 61 and the application program 62.

The operating system 61 is an operating system such as Linux (registered trademark), and performs basic processing such as management of hardware. The application program 62 performs processing such as display of the image of a subject to be photographed and browsing of the photographed images.

The operating system 61 includes a kernel 71, a device driver 72, a power management mechanism 73, a paused state determination program 74, a paused state information providing program 75, an other-CPU-program reading program 76, a set value storage processing program 77, and a warm-boot-image generating program 78.

The kernel 71 constitutes the core of the operating system 61, and provides basic functions of the operating system 61, such as the monitoring of the application program 62 and devices ranging from the mask ROM 13 to the general-purpose input/output section 32, the management of resources of the SDRAM 29 or memory card 22, NAND-type flash memory 26, and the like, interrupt processing, or inter-process communication.

The device driver 72 controls devices such as the signal processing section 16, the serial interface 19, the graphic controller 21, the memory card interface 23, the controller 25, the IDE interface 28, and the general-purpose input/output section 32. Although the device driver 72 is originally a program for individually controlling the devices ranging from the signal processing section 16 to the general-purpose input/output section 32, the device driver 72 will herein be described as collectively controlling the devices ranging from the signal processing section 16 to the general-purpose input/output section 32, without individual differentiation.

The power management mechanism 73 is an ACPI (advanced configuration and power interface) subsystem or the like, and manages the power so as to pause the digital still camera in a suspend state, hibernation, or soft-off state, or to make the digital still camera enter an active state from a paused state in either the suspend, hibernation, or soft-off state.

The paused state determination program 74 determines whether the digital still camera is to pause in a suspend state or hibernation when pausing the digital still camera.

The paused state information providing program 75 supplies, when the digital still camera pauses, paused state information indicating the determined state of either the suspend state or hibernation to the embedded controller 33 via the serial interface 19.

The other-CPU-program reading program 76 loads, when the digital still camera pauses, the operating system and application program of the real-time CPU 12 which are stored in the NAND-type flash memory 17, to the SDRAM 29.

It should be noted that in the following description, reading a program or data stored in the NAND-type flash memory 17 and loading the read program or data to the SDRAM 29 will be referred to as loading the program or data from the NAND-type flash memory 17 to the SDRAM 29.

The set value storage processing program 77 stores, when the digital still camera pauses, set values required for a return performed when the digital still camera activates after the pause, such as the shutter speed and exposure, zoom, the size of an image to be photographed and compression ratio used for encoding, or the values of internal registers of the host CPU 11.

The warm-boot-image generating program 78 generates a warm-boot image displayed immediately after activation when firmware, that is, the operating system 61 and the application program 62 are updated, and activation is performed from a state in which power supply is stopped. The warm-boot-image generating program 78 stores the generated warm-boot image into the NAND-type flash memory 17.

The application program includes a photographic processing program 81, a browse processing program 82, a setting processing program 83, a USB mass-storage class processing program 84, a state transition processing program 85, and a power management program 86.

The photographic processing program 81 controls the display of the image of a subject to be photographed on the LCD 20, the image processing of the photographed image, the encoding and storage of image data obtained by photography, and the like. That is, the photographic processing program 81 performs photographic processing.

The browse processing program 82 performs the processing of allowing the user to browse images by, for example, displaying images on the LCD 20 on the basis of image data generated by photography and stored in the NAND-type flash memory 26 or memory card 22.

The setting processing program 83 performs various kinds of setting, such as settings related to the shutter speed, exposure, or zoom, or the size of an image to be photographed, the method of encoding, the compression ratio used for encoding, the storage destination of image data, and the manner of display for image browsing.

The USB mass-storage processing program 84 performs USB mass-storage class processing for causing the digital still camera to operate as a recording device, when the other terminal of a cable whose one terminal is connected to equipment such as a personal computer is connected to the USB connection terminal 41.

The respective programs from the photographic processing program 81 to the USB mass-storage class processing program 84 perform necessary GUI processing in the respective kinds of processing from the photographic processing to the USB mass-storage class processing.

The state transition processing program 85 performs state transition processing of making transition to a predetermined state from among a plurality of states included in an active state. The active state will be described later in detail.

The power management program 86 is a power management program (Power Management Interface) offered by Linux (registered trademark) kernel, and manages power by issuing various kinds of command related to the state of power.

It should be noted that the operating system 61 may include the state transition processing program 85.

Figure 3:
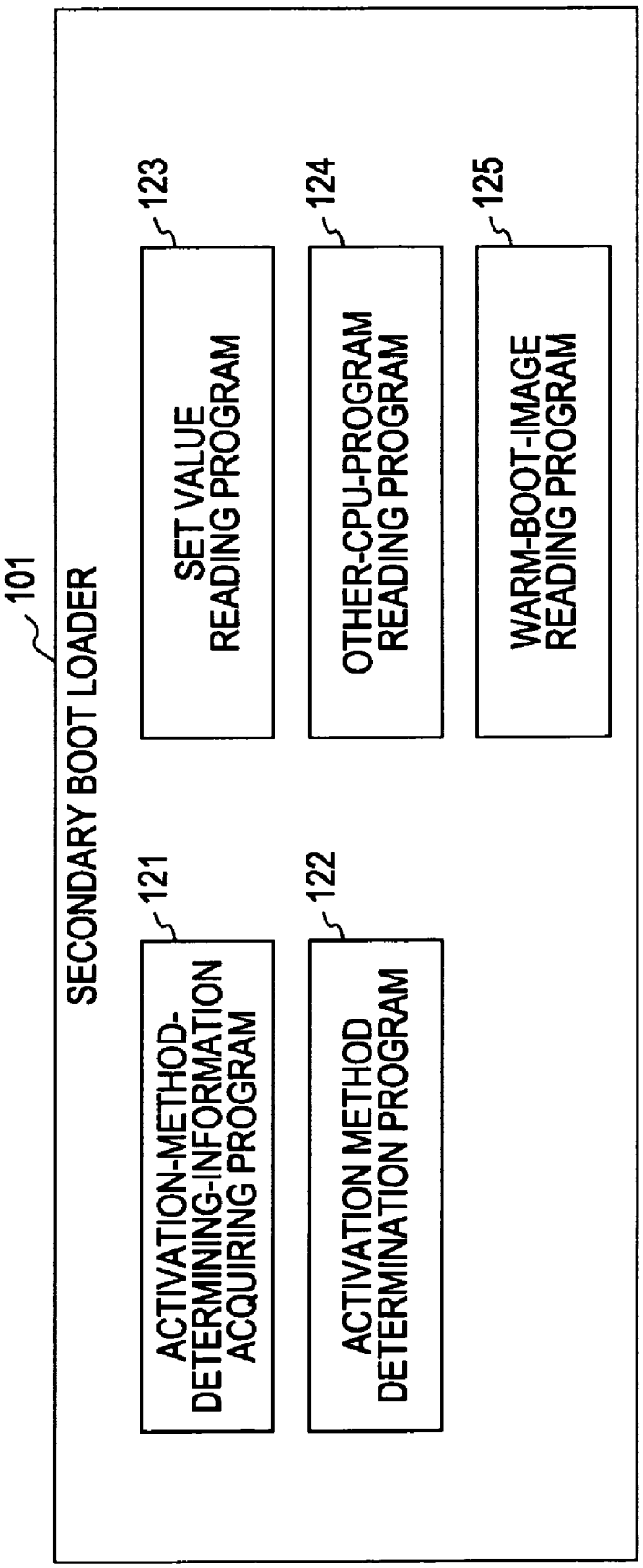
FIG. 3 is a block diagram showing the configuration of a secondary boot loader executed by a host CPU.

Next, referring to FIG. 3, description will be given of a secondary boot loader that is executed by the host CPU 11 when activation is performed. At the time of activation, this secondary boot loader is loaded to the SDRAM 29 by the boot loader executed by the host CPU 11, and executed.

A secondary boot loader 101 is a program corresponding to "grub" or "lilo" used in a PC (Personal Computer), and controls the activation of the operating system 61 and application program 62.

The secondary boot loader 101 includes an activation-method-determining-information acquiring program 121, an activation method determination program 122, a set value reading program 123, an other-CPU-program reading program 124, and a warm-boot-image reading program 125.

The activation-method-determining-information acquiring program 121 acquires from the embedded controller 33 activation method determining information stored in an internal memory of the embedded controller 33. The activation method determining information refers to information for determining the method of activation.

Examples of method of activation include a method of performing activation by executing a program, which is a program that was stored in the SDRAM 29 in the active state immediately before a pause, and which is stored in the SDRAM 29 in the suspend state, and a method of performing activation by loading a warm-boot image, which is the image of a program that was stored in the SDRAM 29 in the active state immediately before a pause, and which is stored in the NAND-type flash memory 17, to the SDRAM 29 and executing the warm-boot image.

Hereinafter, the method of performing activation by executing a program, which is a program that was stored in the SDRAM 29 in the active state immediately before a pause, and which is stored in the SDRAM 29 in the suspend state, will be referred to as a hot boot. Further, the method of performing activation by loading a warm-boot image, which is the image of a program that was stored in the SDRAM 29 in the active state immediately before a pause, and which is stored in the NAND-type flash memory 17, to the SDRAM 29 and executing the warm-boot image will be referred to as a warm boot.

Furthermore, a method of performing activation by opening the file of the operating system stored in the NAND-type flash memory 17 will be referred to as a cold boot.

As for the time required for activation, the time required for activation by a warm boot is long as compared with the time required for activation by a hot boot, and the time required for activation by a cold boot is extremely long as compared with the time required for activation by a warm boot. That is, it can be said that activation by a hot boot is extremely fast as compared with activation by a cold boot, activation by a warm boot is fast as compared with activation by a cold boot, and activation by a hot boot is fast as compared with activation by a warm boot.

It should be noted that activation by a hot boot or warm boot is generally referred to as "resume".

The object of activation by a hot boot, warm boot, or cold boot is the digital still camera, the host CPU 11, or the operating system 61. It can be thus said that the digital still camera is subjected to a hot boot, warm boot, or cold boot, the host CPU 11 is subjected to a hot boot, warm boot, or cold boot, or the operating system 61 is subjected to a hot boot, warm boot, or cold boot.

Next, activation method determining information will be described. More specifically, activation method determining information includes paused state information and battery attachment/detachment information, and further includes activating-factor information.

The paused state information is information indicating the determined paused state when the digital still camera pauses. It should be noted that the paused state information includes an image creation flag indicating whether or not to create a warm-boot image. For example, an image creation flag that is set (standing up) indicates that a warm-boot image is to be created, and an image creation flag that is cleared (not standing up) indicates that no warm-boot image is to be created.

The battery attachment/detachment information indicates a history of attachment/detachment of the battery 35 in a paused state.

The activating-factor information indicates an activating factor that serves as an activation trigger, such as depression of the power button, wireless LAN button, or USB button of the input section 31, connection of equipment to the USB connection terminal 41, or opening of the lens cap.

The activation-method-determining-information acquiring program 121 stores the activation method determining information acquired from the embedded controller 33 into a predetermined storage area of the SDRAM 29.

The activation method determination program 122 determines the method of activation on the basis of the activation method determining information.

The set value reading program 123 reads, when the digital still camera pauses, the set values stored into the NAND-type flash memory 17 by the set value storage processing program 77.

The other-CPU-program reading program 124 loads, in the case of a warm boot or cold boot, the operating system and application program of the real-time CPU 12 stored in the NAND-type flash memory 17 to the SDRAM 29.

The warm-boot image reading program 125 loads, in the case of a warm boot, the warm-boot image stored in the NAND-type flash memory 17 to the SDRAM 29.

Figure 4:
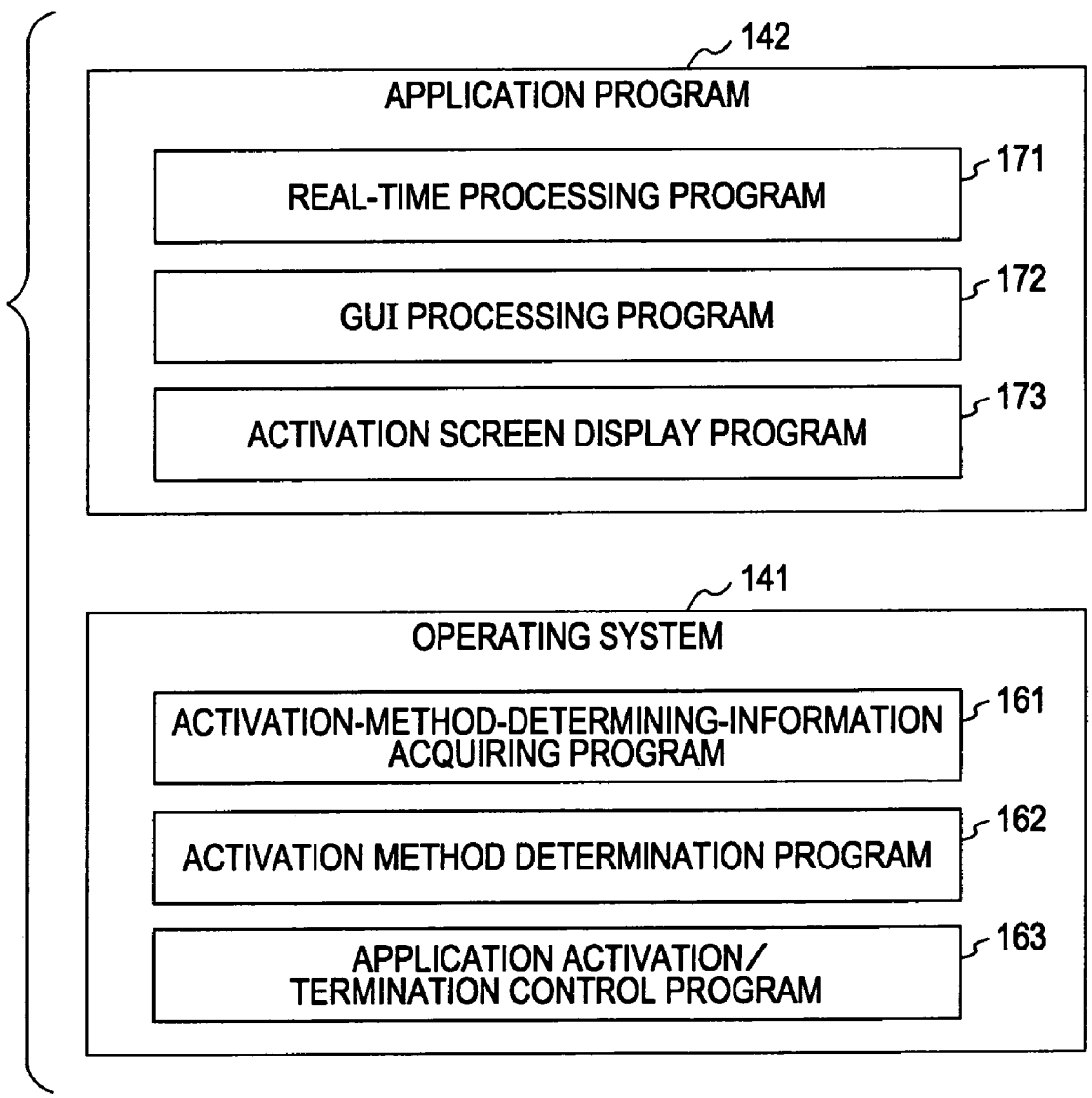
FIG. 4 is a block diagram showing the configuration of an operating system and an application program that are executed by a real-time CPU.

Next, an operating system 141 and an application program 142 executed by the real-time CPU 12 will be described with reference to FIG. 4.

The real-time CPU 12 executes the operating system 141 and the application program 142.

The operating system 141 is a so-called real-time operating system such as μITRON, and performs various kinds of basic processing. The application program 142 performs real-time control processing with respect to an optical system (not shown), the CCD 14, the analog front end 15, and the signal processing section 16, which is required when photographing a subject.

The operating system 141 includes an activation-method-determining-information acquiring program 161, an activation method determination program 162, and an application activation/termination control program 163.

The activation-method-determining-information acquiring program 161 reads, when activation is performed, the activation method determining information stored by means of the activation-method-determining-information acquiring program 121 from a predetermined storage area of the SDRAM 29, thereby acquiring the activation method determining information.

The activation method determination program 162 determines the method of activation on the basis of activation method determining information. In this case, the activation method determination program 162 determines the method of activation to be the same method of activation as that determined by the activation method determination program 122, on the basis of the activation method determining information shared with the activation method determination program 122.

The application activation/termination control program 163 controls, when activation is performed, the activation and termination of various kinds of processing of the application program 142 on the basis of activating-factor information included in the activation method determining information.

The application program 142 includes a real-time processing program 171, a GUI processing program 172, and an activation screen display program 173.

The real-time processing program 171 controls the optical system (not shown), the CCD 14, the analog front end 15, and the signal processing section 16 in real time.

The GUI processing program 172 performs the processing of a user interface for acquisition of a user's instruction from the input section 31, which is shared between the real-time CPU 12 and the host CPU 11. The GUI processing program 172 performs a part of the GUI processing performed by each of the photographic processing program 81 to the USB mass-storage class processing program 84, for example, limited GUI processing with respect to a set value whose setting may sometimes be requested immediately after activation, such as a set value of the shutter speed, exposure, or zoom.

The activation screen display program 173 causes, when activation is performed, the LCD 20 to display an activation screen indicating activation.

It should be noted that the application program 142 may include the application activation/termination control program 163.

Figure 5:
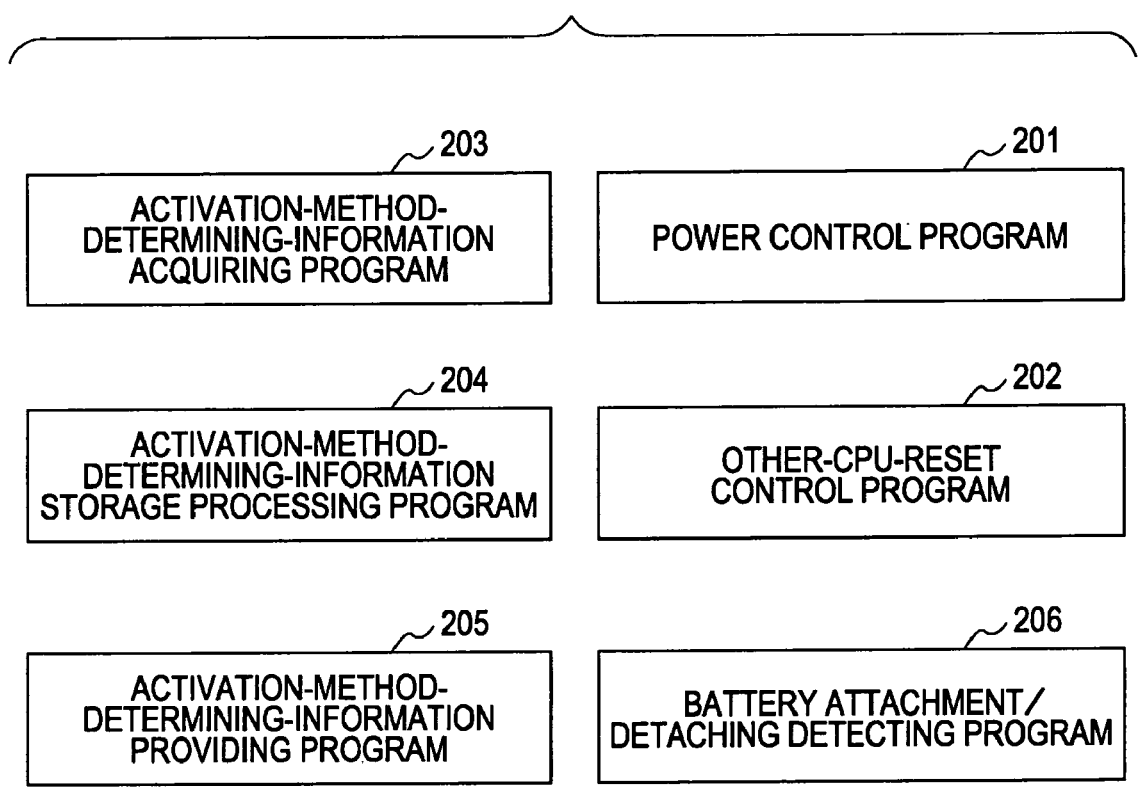
FIG. 5 is a block diagram showing the configuration of programs executed by an embedded controller.

Next, programs executed by the embedded controller 33 will be described. FIG. 5 is a diagram showing the programs executed by the embedded controller 33. The embedded controller 33 executes a power control program 201, an other-CPU-program reset control program 202, an activation-method-determining-information acquiring program 203, an activation-method-determining-information storage processing program 204, an activation-method-determining-information providing program 205, and a battery attachment/detachment detecting program 206.

The power control program 201 controls the supply of electric power to the individual sections of the digital still camera by controlling the DC-DC converter 34.

The other-CPU-program control program 202 controls the reset of the host CPU 11 and the cancellation thereof.

The activation-method-determining-information acquiring program 203 acquires activation method determining information.

More specifically, when the digital still camera pauses, the activation-method-determining-information acquiring program 203 acquires paused state information of activation method determining information by receiving the paused state information transmitted from the paused state information providing program 75.

Further, the activation-method-determining-information acquiring program 203 acquires from the battery attachment/detachment detecting program 206 the detection result of attachment/detachment of the battery 35. The activation-method-determining-information acquiring program 203 generates battery attachment/detachment information corresponding to the detection result of attachment/detachment of the battery 35. Further, the activation-method-determining-information acquiring program 203 generates activating-factor information indicating an activation trigger such as depression of the power button, wireless LAN button, or USB button, or opening of the lens cap, in accordance with a signal that is supplied from the input section 31 and indicates depression of the power button, wireless LAN button, or USB button, or opening/closing of the lens cap.

The activation-method-determining-information storage processing program 204 stores the acquired activation method determining information into an internal memory of the embedded controller 33. That is, the activation-method-determining-information storage processing program 204 stores the received paused state information, the generated battery attachment/detachment information, or the generated activating-factor information into the internal memory of the embedded controller 33.

The activation-method-determining-information providing program 205 provides the activation method determining information stored in the internal memory of the embedded controller 33 to the host CPU 11, via the serial interface 19 and in response to a request from the host CPU 11.

The battery attachment/detachment detecting program 206 detects attachment/detachment of the battery 35 by detecting the output voltage of the DC-DC converter 34.

Figure 6:
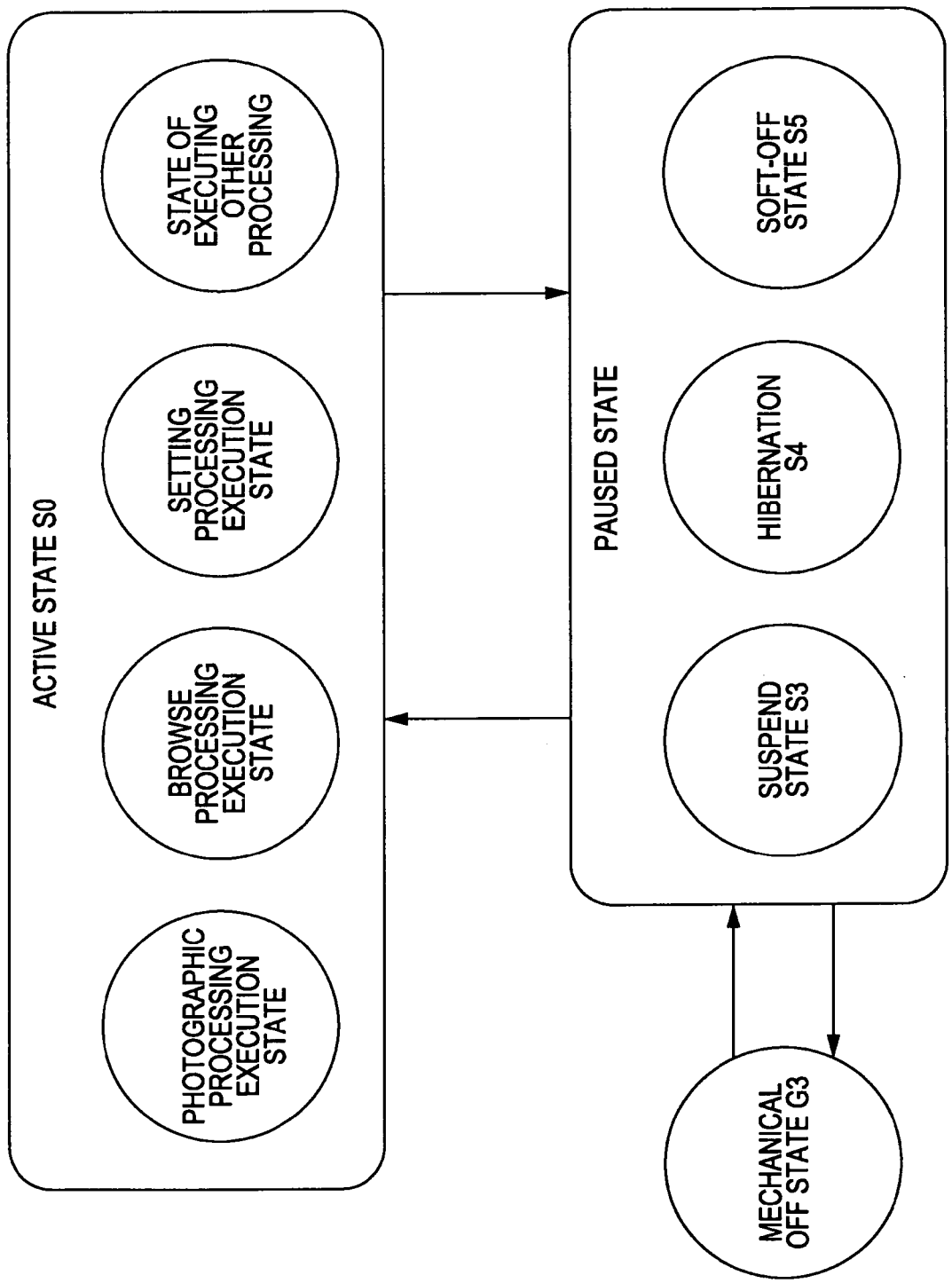
FIG. 6 is a diagram illustrating states of a digital still camera.

Next, referring to FIGS. 6 to 9, the state of the digital still camera will be described. As shown in FIG. 6, the state of the digital still camera is one of a mechanical off state G3, a suspend state S3, hibernation S4, a soft-off state S5, a photographic processing execution state, a browse processing execution state, a setting processing execution state, or a state of executing other processing.

In the photographic processing execution state, the photographic processing program 81 is being executed by the host CPU 11. In the browse processing execution state, the browse processing program 82 is being executed by the host CPU 11. In the setting processing execution processing, the setting processing program 83 is being executed by the host CPU 11.

In the state of executing other processing, the USB mass-storage class processing program 84 is being executed by the host CPU 11. Alternatively, in the state of executing other processing, although the application program 62 is being executed by the host CPU 11, neither of the photographic processing program 81, the browse processing program 82, the setting processing program 83, and the USB mass-storage processing program 84 is being executed.

Each of the suspend state S3, the hibernation S4, and the soft-off state S5 will be referred to as a paused state. Further, each of the photographic processing execution state, the browse processing execution state, the setting processing execution state, and the state of executing other processing will be referred to an active state S0.

FIG. 7 is a diagram showing the presence/absence of power supply to the host CPU 11, the SDRAM 29, or the embedded controller 33 in each of the active state S0, suspend state S3, hibernation S4, soft-off state S5, and mechanical off state G3.

"N" in FIG. 7 indicates that power is being supplied, and OFF indicates that supply of power is being stopped, that is, power is not being supplied.

In the active state S0, power is supplied from the DC-DC converter 34 to all of the host CPU 11, the SDRAM 29, and the embedded controller 33.

In the suspend state S3, the supply of power from the DC-DC converter 34 to the host CPU 11 is stopped, and power is supplied from the DC-DC converter 34 to the SDRAM 29 and the embedded controller 33. Since the SDRAM 29 refreshes its stored data (program) by itself when supplied with power due to its self-refresh function, in the suspend state S3, the SDRAM 29 maintains its stored program and data.

In the hibernation S4 and the soft-off state S5, the supply of power from the DC-DC converter 34 to the host CPU 11 and the SDRAM 29 is stopped, and power is supplied from the DC-DC converter 34 to the embedded controller 33.

Since the hibernation S4 and the soft-off state S5 are the same state electrically in the case of the digital still camera, in the following description, the hibernation S4 and the soft-off state S5 will not be differentiated from each other.

In the mechanical off state G3, the supply of power from the DC-DC converter 34 to the host CPU 11, the SDRAM 29, and the embedded controller 33 is stopped. It should be noted, however, that power is supplied to the embedded controller 33 from the battery 36. The operation of the real-time clock (RTC) built in the embedded controller 33 is thus retained.

It should be noted that like the power to the host CPU 11, the power to the real-time CPU 12 is supplied in the active state S0, and its supply is stopped in the suspend state S3, the hibernation S4, the soft-off state S5, and the mechanical off state G3.

Figure 8:
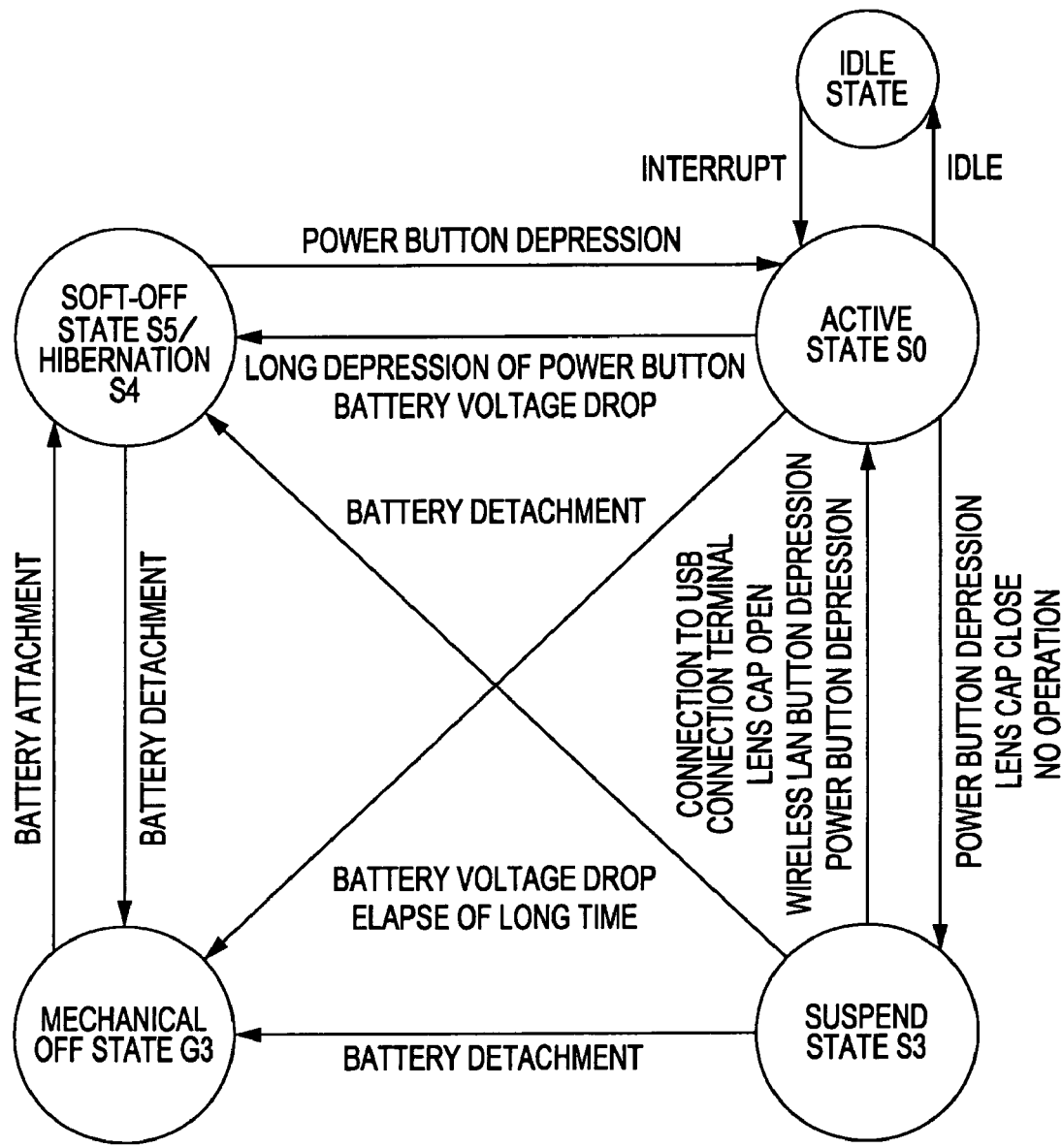
FIG. 8 is a diagram showing the transition of states of a digital still camera.

FIG. 8 is a diagram showing the transition of states. In the mechanical off state G3, when the batter 35 is attached, the state of the digital still camera transitions to the hibernation S4 (soft-off state S5).

In the hibernation S4 (soft-off state S5), when the battery 35 is detached, the state of the digital still camera transitions to the mechanical off state G3.

In the hibernation S4 (soft-off state S5), when the power button of the input section 31 is depressed, the state of the digital still camera transitions to the active state so. Conversely, when, in the activate state S0, the power button is long-depressed, that is, when the power button is depressed continuously for a time longer than a predetermined time, the state of the digital still camera transitions to the hibernation S4 (soft-off state S5).

In the active state S0, when the power button is depressed, the lens cap is closed, or no user operation is performed for a time longer than a predetermined period (i.e. no operation), the state of the digital still camera transitions to the suspend state S3.

In the suspend state S3, when the power button is depressed, the wireless LAN button of the input section 31 is depressed, the lends cap is opened, or the other terminal of a cable whose one terminal is connected to another equipment is connected to the USB connection terminal 41, the state of the digital still camera transitions to the active state S0.

In the suspend state S3, when the voltage of the battery 35 becomes lower than a predetermined threshold, or a predetermined length of time, that is, a long time has elapsed since the transition to the suspend state S3, the state of the digital still camera transitions to the hibernation S4 (soft-off state S5).

Further, in the suspend state S3, when the battery 35 is detached, the state of the digital still camera transitions to the mechanical off state G3. Likewise, in the active state S0, when the battery 35 is detached, the state of the digital still camera transitions to mechanical off state G3.

It should be noted that when, in the active state S0, no processing is executed for a fixed period of time (when in idle), the state of the digital still camera transitions to a so-called idle state in which the frequency of the clock of the host CPU 11 is dropped. In the idle state, an interrupt occurs every fixed period of time, and the state of the digital still camera becomes the active state S0 every fixed period of time.

Figure 9:
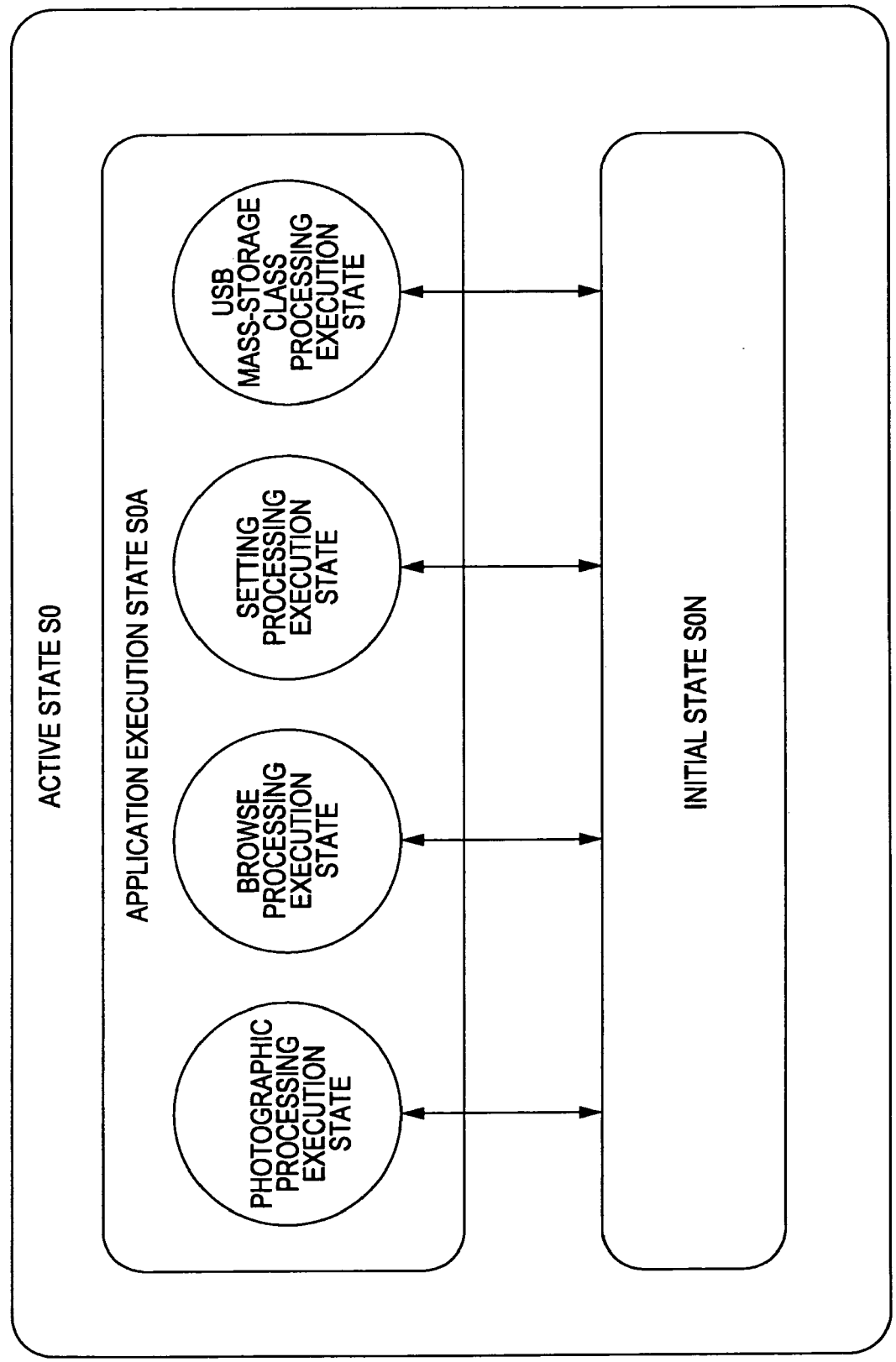
FIG. 9 is a diagram illustrating states of a digital still camera.

Referring to FIG. 9, the active state S0 will be described in detail. The active state S0 includes, in addition to the photographic processing execution state, the browse processing execution state, and the setting processing execution state, a USB mass-storage class processing execution state corresponding to the state of executing other processing, and an initial state S0N.

In the USB mass-storage class processing execution state, the USB mass-storage class processing program 84 is being executed by the host CPU 11.

The initial state S0N is a state in which the execution of application processing is suppressed. While the application program 62 is being executed by the host CPU 11 in the initial state S0N, neither of the photographic processing program 81, the browse processing program 82, the setting processing program 83, and the USB mass-storage processing program 84 is executed.

A transition can be made from the initial state S0N to either the photographic processing execution state, the browse processing execution state, the setting processing execution state, or the USB mass-storage class processing execution state. Likewise, a transition can be made to the initial state S0N from the photographic processing execution state, the browse processing execution state, the setting processing execution state, or the USB mass-storage class processing execution state.

However, a direct transition cannot be made from the photographic processing execution state to the browse processing execution state, the setting processing execution state, or the USB mass-storage class processing execution state, nor can a direct transition be made from the browse processing execution state to the photographic processing execution state, the setting processing execution state, or the USB mass-storage class processing execution state. A direct transition cannot be made from the setting processing execution state to the browse processing execution state, the photographic processing execution state, or the USB mass-storage class processing execution state, nor can a direct transition be made from the USB mass-storage class processing execution state to the photographic processing execution state, the browse processing execution state, or the setting processing execution state.

That is, no direct transition can be made the photographic processing execution state, the browse processing execution state, the setting processing execution state, and the USB mass-storage class processing execution state.

Next, referring to FIGS. 10 to 12, an overview of the procedure of activation processing will be described.

First, description will be given of activation by a warm boot whereby activation is done by loading a warm-boot image which is the image of a program that was stored in the SDRAM 29 in the active state S0 before entering a pause, and which is stored in the NAND-type flash memory 17, to the SDRAM 29 and executing the warm-boot image.

Figure 10:
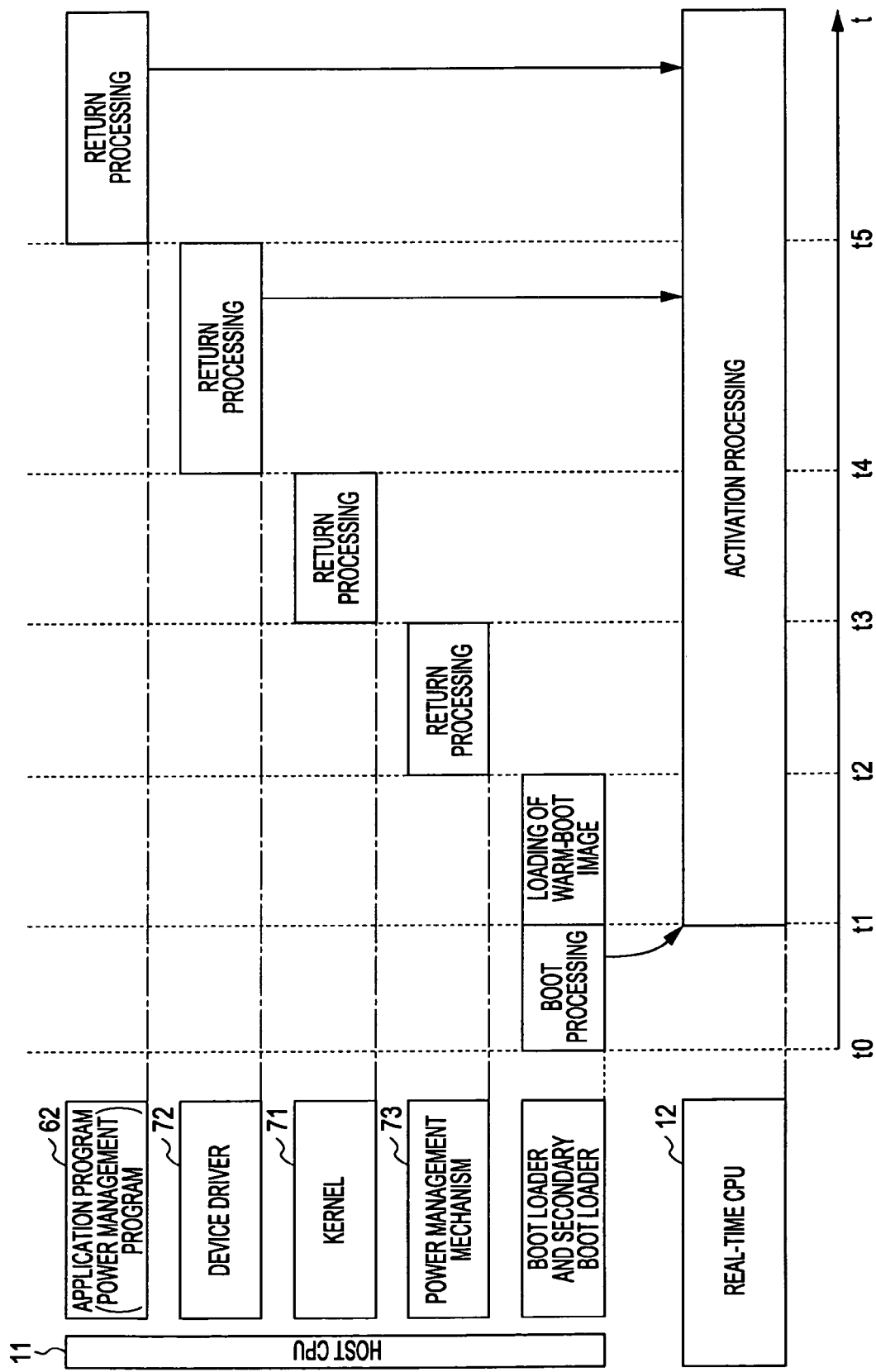
FIG. 10 is a diagram illustrating an overview of the procedure of activation processing by a warm boot.

FIG. 10 is a diagram showing the procedure of activation processing by a warm boot. When, at time t0, the reset of the host CPU 11 is cancelled, the host CPU 11 starts execution of a boot loader stored at a predetermined address in the mask ROM 13. The host CPU 11 executing the boot loader loads the secondary boot loader stored in the NAND-type flash memory 17 to the SDRAM 29. Due to a jump instruction for the boot loader, the host CPU 11 starts execution of the secondary boot loader.

The host CPU 11 executing the secondary boot loader loads the operating system 141 and the application program 142 executed by the real-time CPU 12, which are stored in the NAND-type flash memory 17, to the SDRAM 29.

Then, the host CPU 11 executing the secondary boot loader cancels the reset of the real-time CPU 12.

At time t1, the real-time CPU 12 for which the reset has been cancelled starts execution of a program instruction from the predetermined address in the SDRAM 29, thereby starting execution of the operating system 141.

The host CPU 11 executing the secondary boot loader loads the warm-boot image stored in the NAND-type flash memory 17 to the SDRAM 29.

When loading of the warm-boot image to the SDRAM 29 is completed, at time t2, the host CPU 11 starts execution of the power management mechanism 73 included in the loaded warm-boot image. The host CPU 11 executing the power management mechanism 73 detects the state of power sources including the DC-DC converter 34 and the battery 35, and performs return processing such as correcting internal parameters in accordance with the detected state of power sources.

When the return processing of the power management mechanism 73 is completed, at time t3, the host CPU 11 starts execution of the kernel 71 included in the loaded warm-boot image. The host CPU 11 executing the kernel 71 detects the state of occupancy of the storage space of the SDRAM 29 or the like, and performs return processing such as correcting parameters of the management process of the resources of the SDRAM 29 or the like.

When the return processing of the kernel 71 is completed, at time t4, the host CPU 11 starts execution of the return processing of the device driver 72 included in the loaded warm-boot image. That is, the host CPU 11 detects the state of each of devices such as the signal processing section 16, the serial interface 19, the graphic controller 21, the memory card interface 23, the controller 25, the IDE interface 28, and the general-purpose input/output section 32, and performs return processing such as correcting the parameters of the device driver 72 in accordance with the detected device state.

When the return processing of the device driver 72 is completed, the host CPU 11 notifies the real-time CPU 12 of the fact that the return processing of the device driver 72 is completed.

When the real-time CPU 12 receives from the host CPU 11 a notification indicating that the return processing of the device driver 72 is completed, communication between the real-time control processing executed by executing the real-time processing program 171, and the processing in the host CPU 11 is started.

When the return processing of the device driver 72 is completed, at time t5, the host CPU 11 starts execution of the return processing of the device driver 72 included in the loaded warm-boot image. The host CPU 11 performs the return processing of the application program 62 such as setting a set value for the shutter speed, exposure, zoom, or the like.

When the return processing of the application program 62 is completed, the host CPU 11 notifies the real-time CPU 12 of the fact that the return processing of the application program 62 is completed. The power management program 86 of the application program 62 starts monitoring of the state of power sources by, for example, acquiring parameters indicating the state of power sources from the power management mechanism 73.

Figure 11:
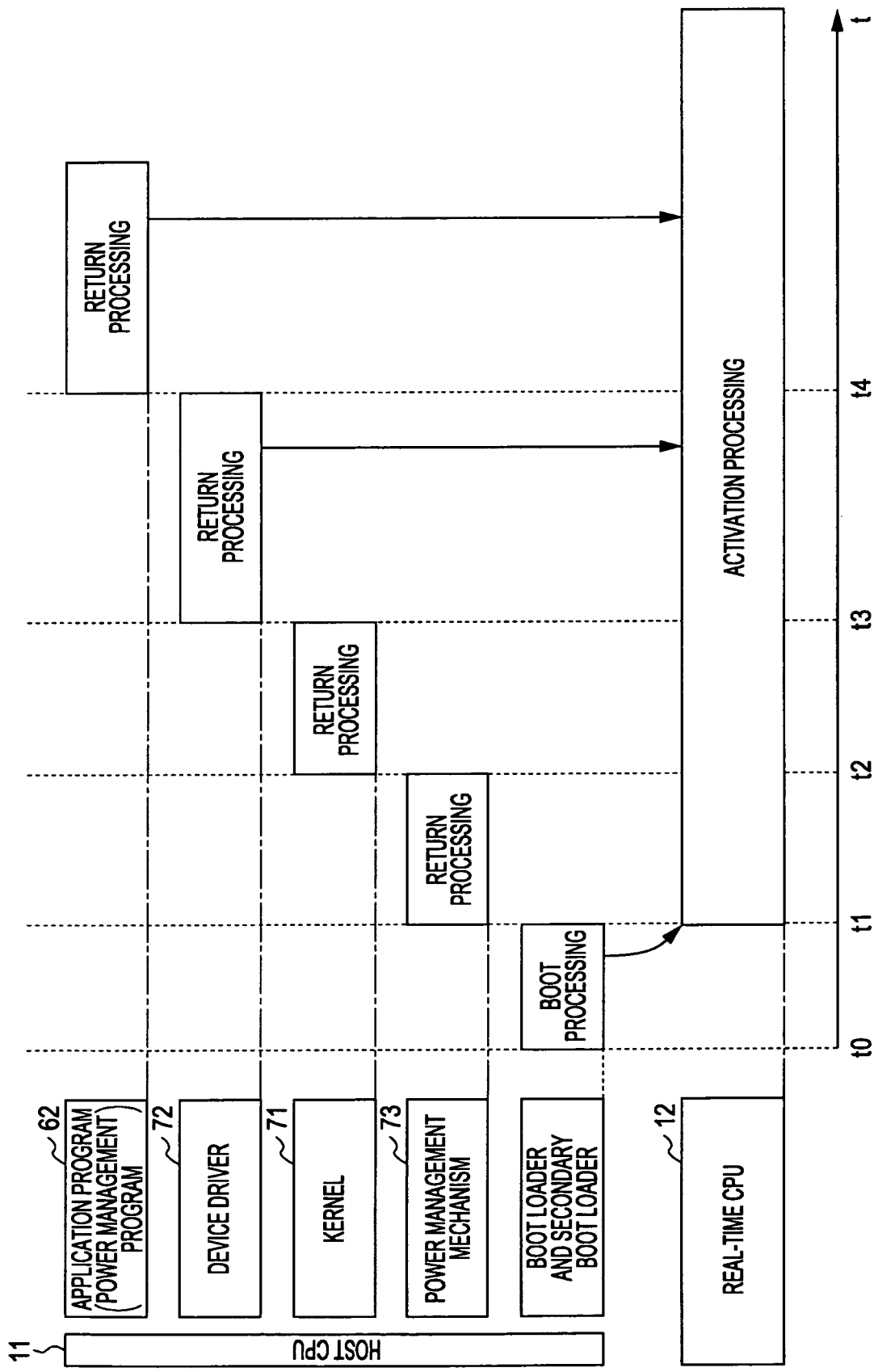
FIG. 11 is a diagram illustrating an overview of the procedure of activation processing by a hot boot.

FIG. 11 is a diagram showing the procedure of activation processing by a hot boot whereby activation is performed by executing a program which was stored in the SDRAM 29 in the active state S0 immediately before a pause and which is stored in the SDRAM 29 in the suspend state S3.

It should be noted that in the suspend state S3 and after the start of activation processing by a hot boot, the SDRAM 29 maintains the storage of the operating system 61, application program 62, and operating system 41 that were stored in the active state S0 immediately before a pause.

When, at time t0, the reset of the host CPU 11 is cancelled, the host CPU 11 starts execution of a boot loader stored at a predetermined address in the mask ROM 13. The host CPU 11 executing the boot loader loads the secondary boot loader stored in the NAND-type flash memory 17 to the SDRAM 29. Due to a jump instruction for the boot loader, the host CPU 11 starts execution of the secondary boot loader.

As described above, in the suspend state S3 and after the start of activation processing by a hot boot, the SDRAM 29 maintains the storage of the operating system 141 and application program 142. Therefore, in the activation processing by a hot boot, there is no need for the host CPU 11 executing the secondary boot loader to load the operating system 141 and the application program 142 to the SDRAM 29 again.

Then, the host CPU 11 executing the secondary boot loader cancels the reset of the real-time CPU 12.

At time t1, the real-time CPU 12 for which the reset has been cancelled starts execution of a program instruction from a predetermined address in the SDRAM 29, thereby starting execution of the operating system 141.

After the reset of the real-time CPU 12 is cancelled, the host CPU 11 starts execution of the power management mechanism 73 stored in the SDRAM 29. The host CPU 11 executing the power management mechanism 73 detects the state of power sources including the DC-DC converter 34 and the battery 35, and performs return processing such as correcting internal parameters in accordance with the detected state of power sources.

When the return processing of the power management mechanism 73 is completed, at time t2, the host CPU 11 starts execution of the kernel 71 stored in the SDRAM 29. The host CPU 11 executing the kernel 71 detects the state of occupancy of the storage space of the SDRAM 29 or the like, and performs return processing such as correcting parameters of the management process of the resources of the SDRAM 29 or the like.

When the return processing of the kernel 71 is completed, at time t3, the host CPU 11 starts execution of the return processing of the device driver 72 stored in the SDRAM 29. That is, the host CPU 11 detects the state of each of devices such as the signal processing section 16, the serial interface 19, the graphic controller 21, the memory card interface 23, the controller 25, the IDE interface 28, and the general-purpose input/output section 32, and performs return processing such as correcting the parameters of the device driver 72 in accordance with the detected device state.

When the return processing of the device driver 72 is completed, the host CPU 11 notifies the real-time CPU 12 of the fact that the return processing of the device driver 72 is completed.

When the real-time CPU 12 receives from the host CPU 11 a notification indicating that the return processing of the device driver 72 is completed, communication between the real-time control processing executed by executing the real-time processing program 171, and the processing in the host CPU 11 is started.

When the return processing of the device driver 72 is completed, at time t4, the host CPU 11 starts execution of return processing of the application program 62 stored in the SDRAM 29. The host CPU 11 performs the return processing of the application program 62 such as setting a set value for the shutter speed, exposure, zoom, or the like.

When the return processing of the application program 62 is completed, the host CPU 11 notifies the real-time CPU 12 of the fact that the return processing of the application program 62 is completed. The power management program 86 of the application program 62 starts monitoring of the state of power sources by, for example, acquiring parameters indicating the state of power sources from the power management mechanism 73.

As described above, in the activation processing by a hot boot, it is unnecessary to perform such processing as reading a warm-boot image from the NAND-type flash memory 17, and loading the warm-boot image to the SDRAM 29, thus enabling faster activation in comparison to the activation processing by a warm boot.

Next, description will be given of a cold boot, which is a method of activation executed in a factory prior to shipping a digital still camera or executed when updating so-called firmware, and in which activation is performed by opening the operating system 61 and the application program 62 stored in the NAND-type flash memory 17.

Figure 12:
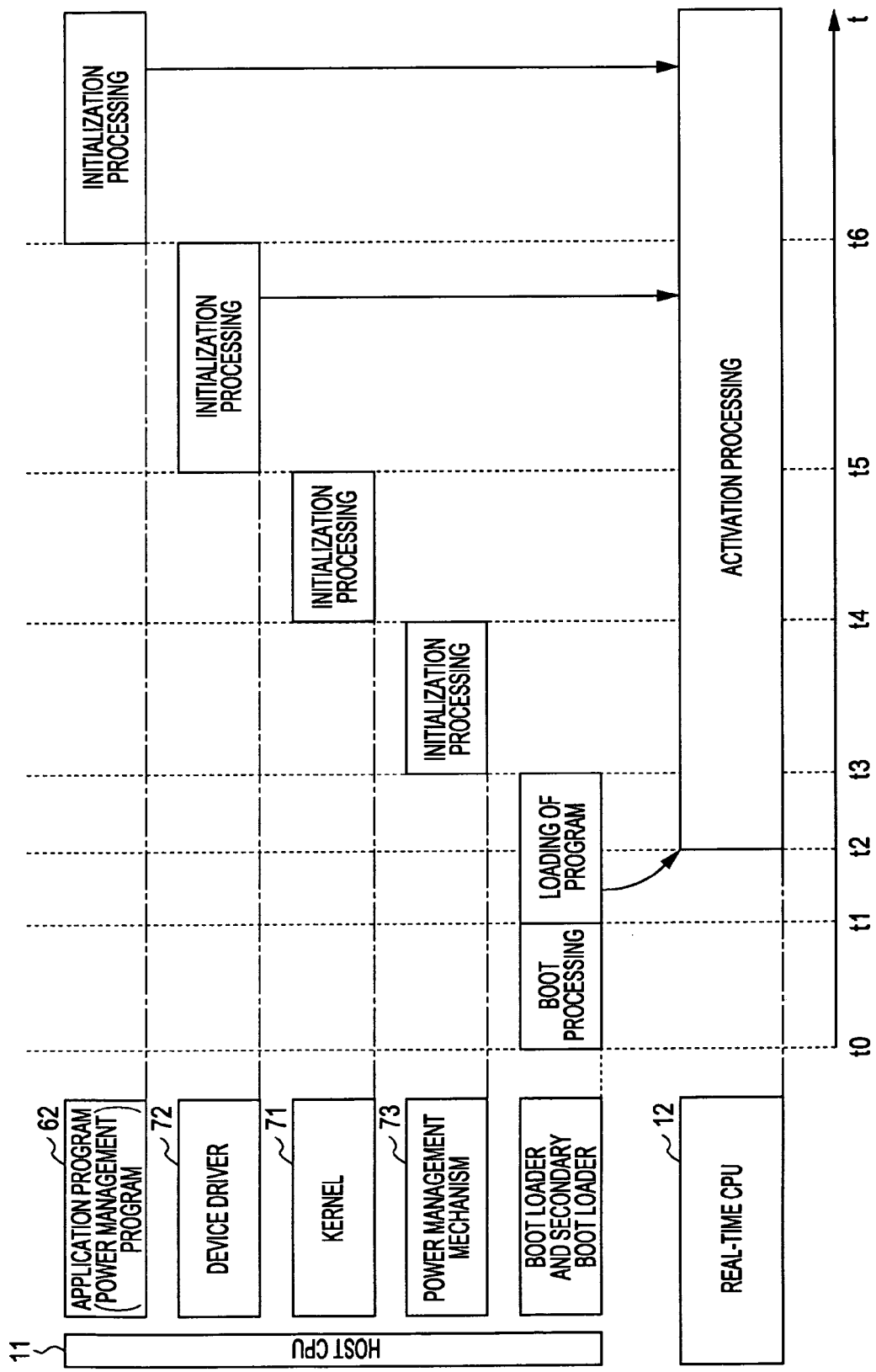
FIG. 12 is a diagram illustrating an overview of the procedure of activation processing by a cold boot.

FIG. 12 is a diagram showing the procedure of activation processing by a cold boot.

When, at time t0, the reset of the host CPU 11 is cancelled, the host CPU 11 starts execution of a boot loader stored at a predetermined address in the mask ROM 13. The host CPU 11 executing the boot loader loads the secondary boot loader stored in the NAND-type flash memory 17 to the SDRAM 29. Due to a jump instruction for the boot loader, the host CPU 11 starts execution of the secondary boot loader.

At time t1, the host CPU 11 executing the secondary boot loader starts loading of the operating system 141 and the application program 142, which are stored in the NAND-type flash memory 17, to the SDRAM 29.

When the loading of the operating system 141 and the application program 142 executed by the real-time CPU 12 to the SDRAM 29 is completed, the host CPU 11 executing the secondary boot loader cancels the reset of the real-time CPU 12.

At time t2, the real-time CPU 12 for which the reset has been cancelled starts execution of a program instruction from a predetermined address in the SDRAM 29, thereby starting execution of the operating system 141.

Further, the host CPU 11 executing the secondary boot loader loads the operating system 61 and the application program 62 stored in the NAND-type flash memory 17 to the SDRAM 29.

When loading of the operating system 61 and the application program 62 to the SDRAM 29 is completed, at time t3, the host CPU 11 starts execution of the power management mechanism 73 loaded to the SDRAM 29. The host CPU 11 executing the power management mechanism 73 detects the state of power sources including the DC-DC converter 34 and the battery 35, and performs initialization processing such as initializing internal parameters in accordance with the detected state of power sources.

When the initialization processing of the power management mechanism 73 is completed, at time t4, the host CPU 11 starts execution of the kernel 71 loaded to the SDRAM 29.

The host CPU 11 executing the kernel 71 detects the size (address range) of the storage space of the SDRAM 29 or the like, and performs initialization processing such as initializing parameters of the management process of the resources of the SDRAM 29 or the like.

When the initialization processing of the kernel 71 is completed, at time t5, the host CPU 11 starts the initialization processing of the device driver 72 loaded to the SDRAM 29. That is, the host CPU 11 detects each of devices such as the signal processing section 16, the serial interface 19, the graphic controller 21, the memory card interface 23, the controller 25, the IDE interface 28, and the general-purpose input/output section 32, and performs initialization processing such as initializing the parameters of the device driver 72 in accordance with the detected device.

When the initialization processing of the device driver 72 is completed, the host CPU 11 notifies the real-time CPU 12 of the fact that the initialization processing of the device driver 72 is completed.

When the real-time CPU 12 receives from the host CPU 11 a notification indicating that the initialization processing of the device driver 72 is completed, communication between the real-time control processing executed by executing the real-time processing program 171, and the processing in the host CPU 11 is started.

When the initialization processing of the device driver 72 is completed, at time t6, the host CPU 11 starts initialization processing of the application program 62 loaded to the SDRAM 29. The host CPU 11 performs the initialization processing of the application program 62, such as setting various parameters used for photographic processing or browse processing to default values.

When the initialization processing of the application program 62 is completed, the host CPU 11 notifies the real-time CPU 12 of the fact that the initialization processing of the application program 62 is completed. The power management program 86 of the application program 62 starts monitoring of the state of power sources by, for example, acquiring parameters indicating the state of power sources from the power management mechanism 73.

Further, the host CPU 11 generates a warm-boot image, and stores the generated warm-boot image into the NAND-type flash memory 17.

In this way, activation processing by a cold boot is executed when, for example, updating firmware, and the warm-boot image stored in the NAND-type flash memory 17 is updated.

It should be noted that the host CPU 11 executing the operating system 61 whose initialization is completed may load the application program 62 stored in the NAND-type flash memory 17 to the SDRAM 29.

Figure 13:
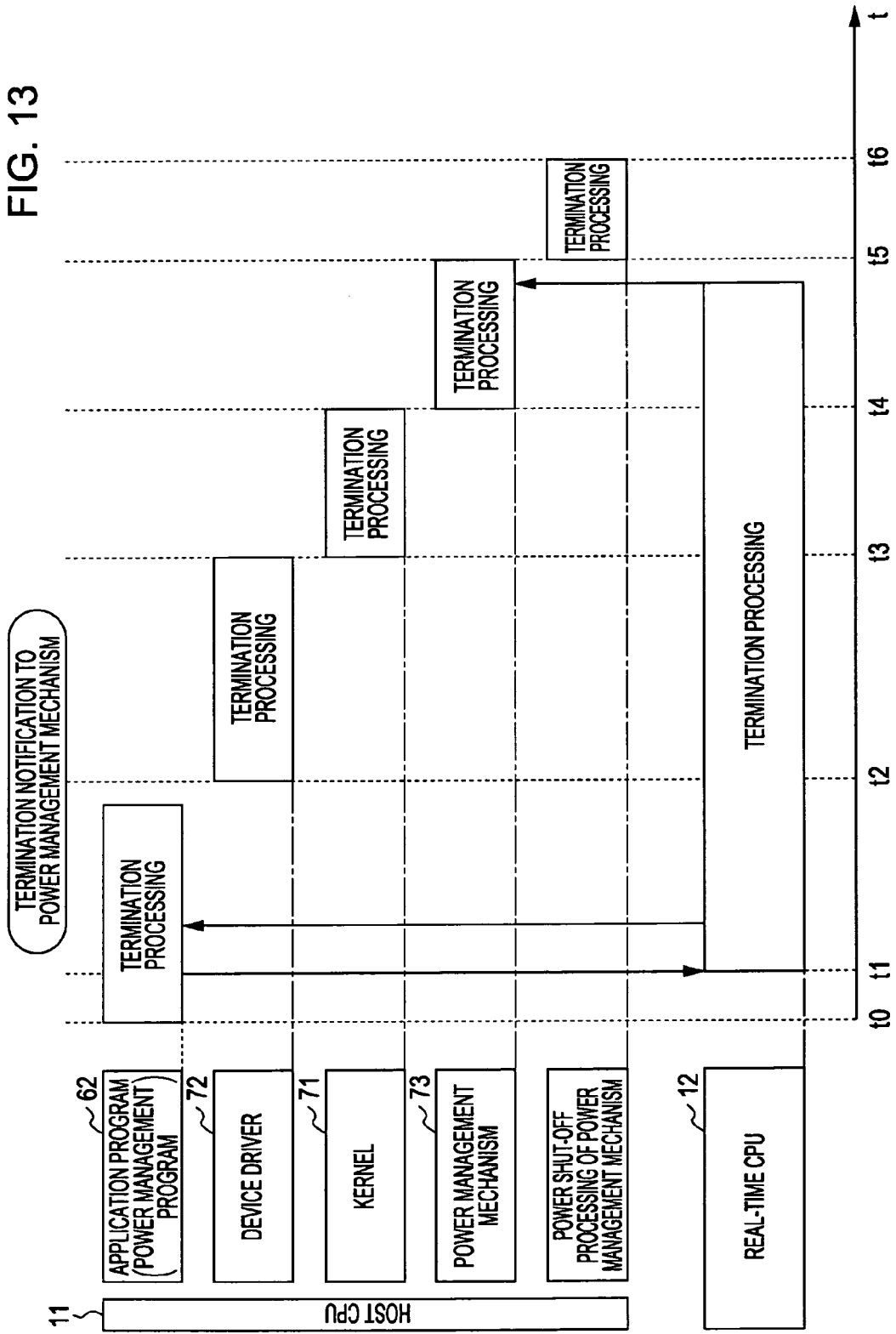
FIG. 13 is a diagram illustrating an overview of the procedure of pause processing.

Next, referring to FIG. 13, description will be given of an overview of the procedure of pause processing for making a transition from the active state S0 to a paused state.

When the start of pause processing is instructed at time t0, the host CPU 11 executing the application program 62 causes the state to transition to the initial state S0N before transition to a paused state. The host CPU 11 executing the application program 62 determines whether the state is to transition to the suspend state S3 or the hibernation S4.

Further, the host CPU 11 executing the application program 62 executes termination processing such as closing the file that stores data of a photographed image.

Further, at time t1, the host CPU 11 executing the application program 62 notifies the real-time CPU 12 of the termination.

Then, the real-time CPU 12 starts termination processing such as returning the lens constituting the optical system (not shown) to the end position.

Further, the power management program 86 of the application program 62 issues a command instructing a transition to the suspend state S3 or hibernation S4 thus determined, thereby notifying the power management mechanism 73 of the termination.

When the termination processing by the host CPU 11 executing the application program 62 is completed, at time t2, the host CPU 11 starts termination processing of the device driver 72, such as terminating the process for controlling each of devices such as the signal processing section 16, the serial interface 19, the graphic controller 21, the memory card interface 23, the controller 25, the IDE interface 28, and the general-purpose input/output section 32.

When the termination processing of the device driver 72 is completed, at time t3, the host CPU 11 starts termination processing of the kernel 71 for completing a predetermined process such as the monitoring of the application program 62 and devices, management of the resources of the SDRAM 29 and the like, interrupt processing, or inter-process communication.

When the termination processing of the kernel 71 is completed, at time t4, the host CPU 11 starts termination processing of the power management mechanism 73 such as setting parameters for a paused state.

When notified of the completion of termination processing from the real-time CPU 12, at time t5, the host CPU 11 executing the power management mechanism 73 requests the embedded controller 33 to stop (shut off) the supply of power, via the serial interface 19. When requested to stop (shut off) the supply of power from the host CPU 11, at time t6, the embedded controller 33 performs the following control. That is, in the case of a transition to the suspend state S3, the embedded controller 33 causes the DC-DC converter 34 to stop (shut off) the supply of power to the host CPU 11 and the real-time CPU 12 while keeping supply of power to the SDRAM 29 as it is, and in the case of a transition to the hibernation S4, the embedded controller 33 causes the DC-DC converter 34 to stop (shut off) the supply of power to the SDRAM 29, the host CPU 11, and the real-time CPU 12.

In this way, a transition can be made to the suspend state S3 or hibernation S4 to pause the digital still camera.

Next, the details of activation processing by a warm boot, a hot boot, and a cold boot will be described.

Figure 14:
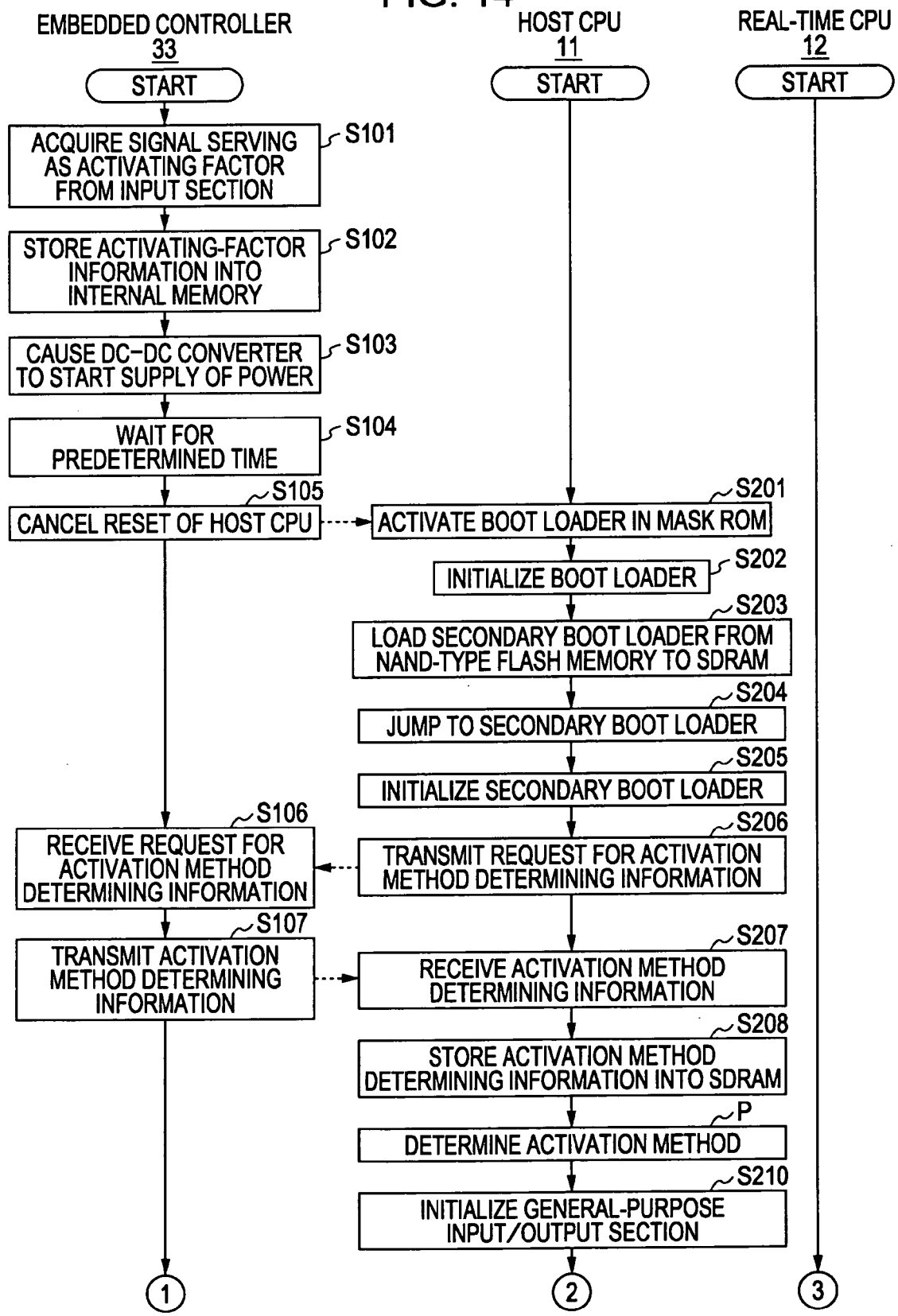
FIG. 14 is a flow chart illustrating the details of activation processing by a warm boot.
Figure 15:
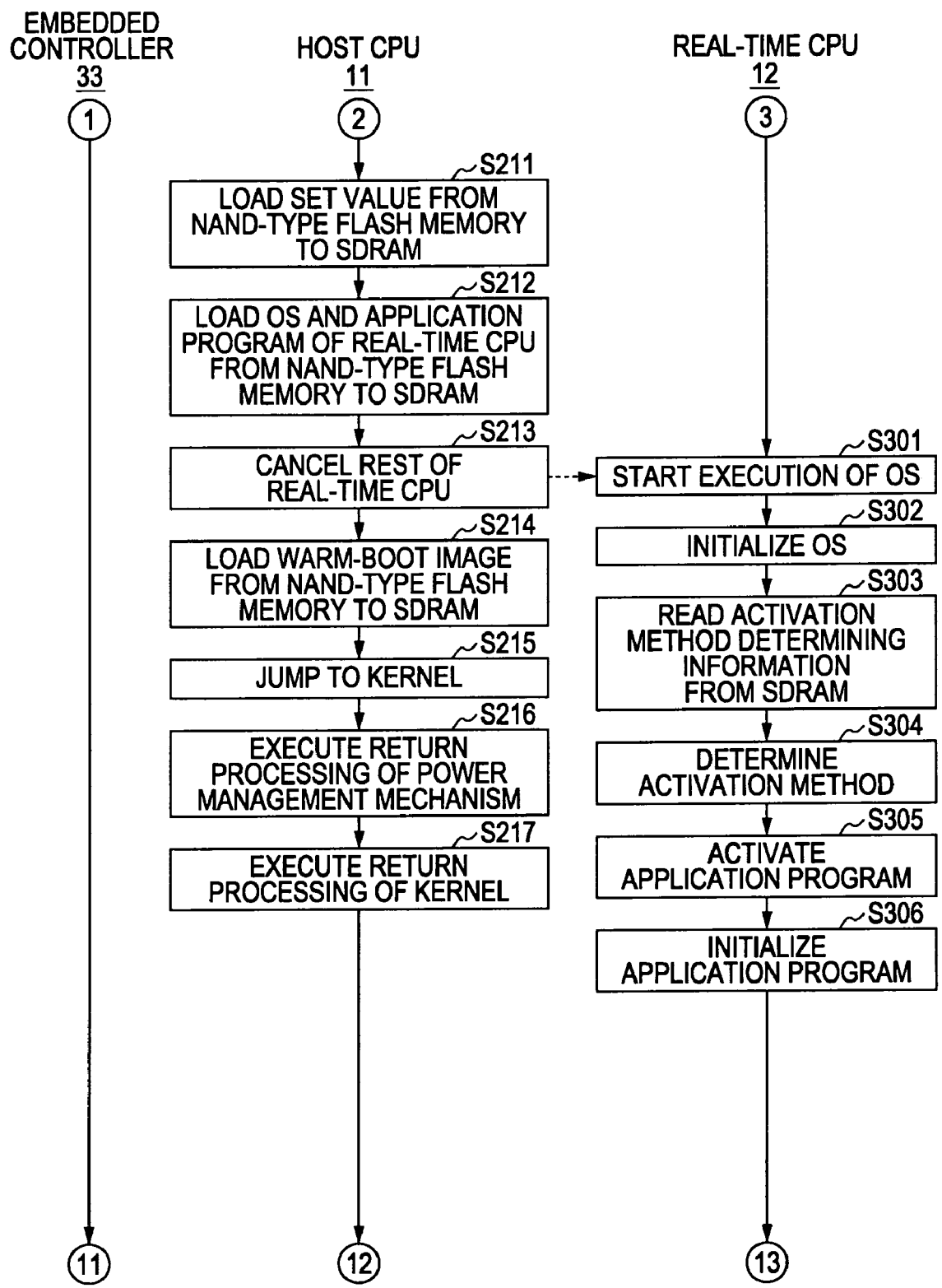
FIG. 15 is a flow chart illustrating the details of activation processing by a warm boot.
Figure 16:
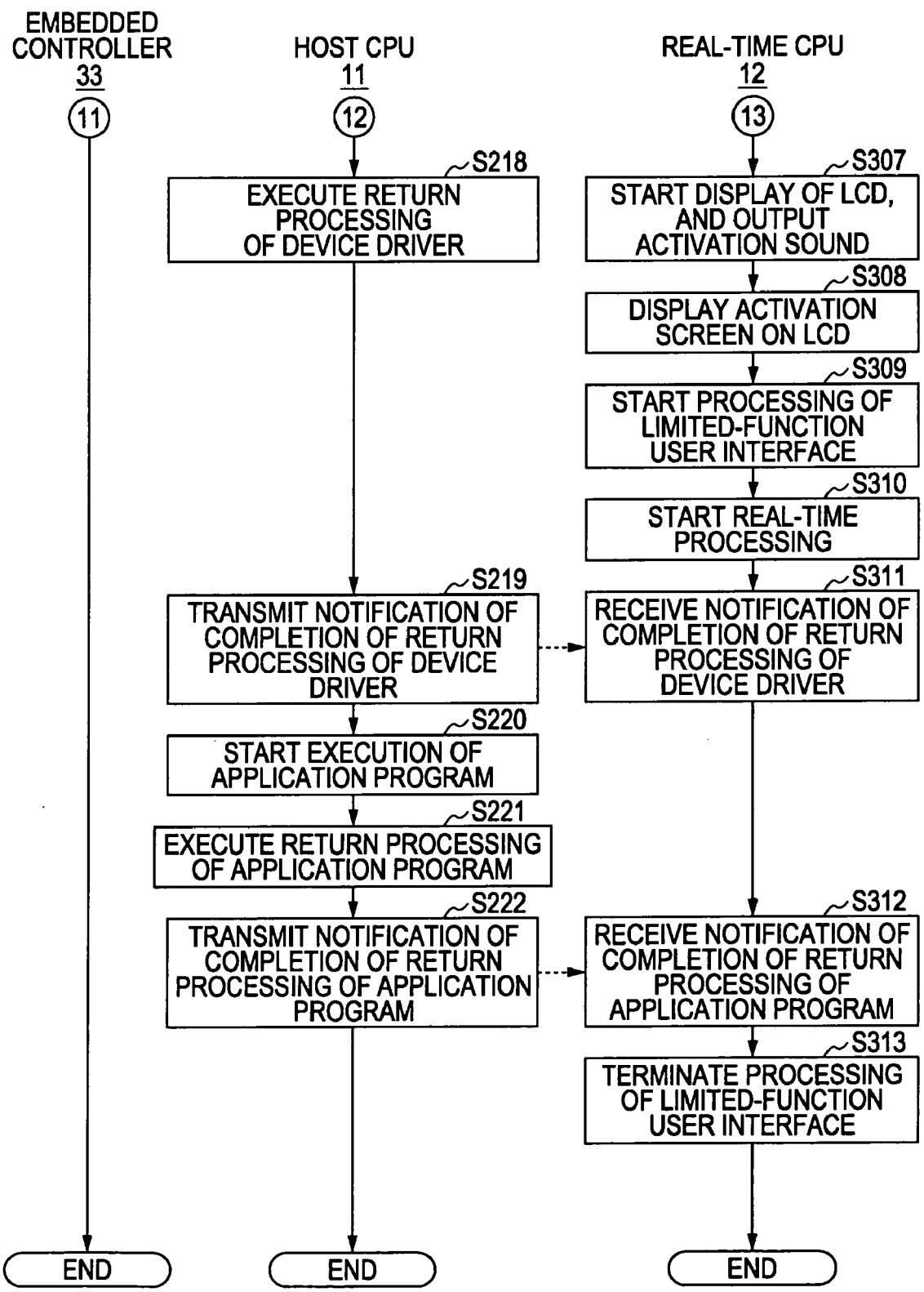
FIG. 16 is a flow chart illustrating the details of activation processing by a warm boot.

FIGS. 14 to 16 show a flowchart illustrating the details of activation processing by a warm boot. In step S101, the embedded controller 33 executing the activation-method-determining-information acquiring program 203 acquires a signal from the input section 31 which serves as an activating factor. That is, the activation-method-determining-information acquiring program 203 acquires a signal indicating the depression of the power button, wireless LAN button, or USB button, or the opening/closing of the lens cap, which is supplied from the input section 31 and serves as an activating factor. In accordance with the acquired signal, the embedded controller 33 executing the activation-method-determining-information acquiring program 203 generates activating-factor information indicating an activation trigger such as the depression of the power button, wireless LAN button, or USB button, or the opening of the lens cap.

In step S102, the embedded controller 33 executing the activation-method-determining-information storage processing program 204 stores into its internal memory the activating-factor information generated in accordance with the signal acquired in step S101. That is, when a signal indicating the depression of the power button, wireless LAN button, or USB button, or the opening/closing of the lens cap, which serves as an activating factor, is acquired from the input section 31 by the activation-method-determining-information acquiring program 203, activating-factor information indicating an activation factor such as the depression of the power button, wireless LAN button, or USB button, or the opening of the lens cap is generated, so the activation-method-determining-information storage processing program 204 stores the generated activating-factor information into the internal memory of the embedded controller 33.

In step S103, the embedded controller 33 executing the power control program 201 causes the DC-DC converter 34 to start the supply of electric power to individual sections of the digital still camera. The supply of power to the individual sections, ranging from the host CPU 11 to the general-purpose input/output section 32, is thus started.

In step S104, the embedded controller 33 waits for a predetermined period of time until the supplied power and the operations of the individual sections to which power supply is started stabilize.

In step S105, the embedded controller 33 executing the other-CPU-reset control program 202 cancels the reset of the host CPU 11. For example, the embedded controller 33 cancels the reset of the host CPU 11 by changing the level of a reset signal of a signal line which connects between the embedded controller 33 and the host CPU 11 and through which the reset signal is supplied.

When the reset is cancelled, in step S201, the host CPU 11 activates a boot loader in the mask ROM 13 to start execution of the boot loader. That is, the host CPU 11 executes an instruction stored at a predetermined address in the mask ROM 13 by a hardware interrupt for reset cancellation, thereby activating the boot loader. In step S202, the host CPU 11 initializes the boot loader.

In step S203, the host CPU 11 executing the boot loader loads the secondary boot loader 101 stored in the NAND-type flash memory 17 to the SDRAM 29. In step S204, the host CPU 11 executes an instruction for a jump to the secondary boot loader 101, which is an instruction included in the boot loader, so the procedure jumps to the secondary boot loader 101. As a result, the host CPU 11 starts execution of the secondary boot loader 101.

It should be noted that the secondary boot loader 101 may be stored in the mask ROM 13 so that a jump is made to the secondary boot loader 101 stored in the mask ROM 13.

In step S205, the host CPU 11 initializes the secondary boot loader 101. Since the driver of the serial interface 19 is included in the secondary boot loader 101, communication can be performed between the host CPU 11 and the embedded controller 33 via the serial interface 19.

In step S206, the host CPU 11 executing the activation-method-determining-information program 121 of the secondary boot loader 101 transmits a request for activation method determining information to the embedded controller 33 via the serial interface 19.

In step S106, the embedded controller 33 executing the activation-method-determining-information providing program 205 receives the request for activation method determining information transmitted from the host CPU 11, via the serial interface 19. In step S107, the embedded controller 33 executing the activation-method-determining-information providing program 205 transmits the activation method determining information stored in the internal memory of the embedded controller 33, to the host CPU 11 via the serial interface 19.

In step S207, the host CPU 11 executing the activation-method-determining-information acquiring program 121 of the secondary boot loader 101 receives the activation method determining information transmitted from the embedded controller 33, via the serial interface 19.

In step S208, the host CPU 11 executing the activation-method-determining-information acquiring program 121 of the secondary boot loader 101 stores the received activation method determining information into the SDRAM 29. In this case, the host CPU 11 stores the activation method determining information into a predetermined area of the storage area of the SDRAM 29.

In step S209, the host CPU 11 executing the activation method determination program 122 of the secondary boot loader 101 determines the method of activation on the basis of the activation method determining information acquired by the reception in step S207. In this case, the method of activation is determined to be the method of activation by a warm boot. It should be noted that if the paused state information indicates the suspend state S3 and the battery attachment/detachment information indicates that the battery has been detached, or if the paused state information indicates the hibernation S4, the activation method determination program 122 determines the method of activation to be the method of activation by a warm boot.

In step S210, the host CPU 11 executing the secondary boot loader 101 initializes the general-purpose input/output section 32.

In step S211, the host CPU 11 executing the set value reading program 123 of the secondary boot loader 101 loads set values of the shutter speed and exposure, zoom, or the size of an image to be photographed and the compression ratio used for encoding, which are required for a return operation at activation, from the NAND-type flash memory 17 to the SDRAM 29.

In step S212, the host CPU 11 executing the other-CPU-program reading program 124 of the secondary boot loader 101 loads the operating system 141 and application program 142 of the real-time CPU 12 from the NAND-type flash memory 17 to the SDRAM 29.

In step S213, the host CPU 11 executing the secondary boot loader 101 cancels the reset of the real-time CPU 12.

When the reset is cancelled, in step S301, the real-time CPU 12 starts execution of the operating system 141 loaded to the SDRAM 29. That is, for example, the real-time CPU 12 starts execution of the operating system 141 by executing an instruction stored at a predetermined address in the SDRAM 29, by a hardware or software interrupt for reset cancellation. In step S302, the host CPU 11 initializes' the operating system 141.

In step S303, the real-time CPU 12 executing the activation-method-determining-information acquiring program 161 of the operating system 141 reads the activation method determining information stored in step S208 from the SDRAM 29. In step S304, the real-time CPU 12 executing the activation method determination program 162 of the operating system 141 determines the method of activation through the same processing as in step S209, on the basis of the activation method determining information read in step S303. In this case, the method of activation is determined to be the method of activation by a warm boot.

In step S305, the real-time CPU 12 executing the operating system 141 activates the application program 142.

In step S306, the real-time CPU 12 initializes the application program 142.

In step S307, the real-time CPU 12 executing the application program 142 controls the graphic controller 21 to start display of the LCD 20, and causes a speaker or buzzer (not shown) to output activation sound.

In step S308, the real-time CPU 12 executing the activation screen display program 173 of the application program 142 controls the graphic controller 21 to display an activation screen indicating activation on the LCD 20.

In step S309, the real-time CPU 12 executing the GUI processing program 172 of the application program 142 starts processing of a user interface through which a user instruction is acquired from the input section 31 that the real-time CPU 12 shares with the host CPU 11 and which provides a small number of functions in comparison to the functions of the application program 62, that is, processing of a limited-function user interface.

In step S310, the real-time CPU 12 executing the real-time processing program 171 of the application program 142 starts real-time control processing with respect to the optical system (not shown), the CCD 14, the analog front end 15, and the signal processing section 16.

It should be noted that a configuration is also possible in which in step S310, reference is made to the activating-factor information of the activation method determining information, and if activation is triggered by the opening of the lens cap, initialization processing of the optical system (not shown), the CCD 14, the analog front end 15, and the signal processing section 16 is performed as the real-time control processing.

In parallel with steps S301 to S310 executed by the real-time CPU 12, steps S214 to S218 are executed by the host CPU 11. That is, in step S214, the host CPU 11 executing the warm-boot-image reading program 125 of the secondary boot loader 101 loads the warm-boot image from the NAND-type flash memory 17 to the SDRAM 29.

In step S215, the host CPU 11 executes an instruction for a jump to the kernel 71, which is an instruction included in the secondary boot loader 101, so the procedure jumps to the kernel 71. As a result, the host CPU 11 starts execution of the operating system 61.

In step S216, the host CPU 11 executing the operating system 61 detects the state of power sources including the DC-DC converter 34 and the battery 35, and executes return processing of the power management mechanism 73 such as correcting internal parameters in accordance with the detected state of power sources.

In step S217, the host CPU 11 executing the operating system 61 detects the state of occupancy of the storage space of the SDRAM 29 or the like, and executes return processing of the kernel 71 such as correcting parameters of the management process of the resources of the SDRAM 29 or the like.

In step S218, the host CPU 11 executing the operating system 61 detects the state of each of devices such as the signal processing section 16, the serial interface 19, the graphic controller 21, the memory card interface 23, the controller 25, the IDE interface 28, and the general-purpose input/output section 32, and executes return processing of the device driver 72 such as correcting the parameters of the device driver 72 in accordance with the detected device state.

In step S219, the host CPU 11 executing the operating system 61 transmits a notification of the completion of return processing of the device driver 72 to the real-time CPU 12 via the bus.

In step S311, the real-time CPU 12 executing the operating system 141 receives the notification of the completion of return processing of the device driver 72, which is transmitted from the host CPU 11, via the bus.

In step S220, the host CPU 11 executing the operating system 61 starts execution of the application program 62. In step S221, the host CPU 11 executes return processing of the application program 62 such as setting a set value for the shutter speed, exposure, zoom, or the like.

It should be noted that after step S221, the state of the digital still camera enters the initial state S0N.

In step S222, the host CPU 11 transmits a notification of the completion of return processing of the application program 62 to the real-time CPU 12 via the bus.

In step S312, the real-time CPU 12 receives the notification of the completion of return processing of the application program 62, which is transmitted from the host CPU 11, via the bus.

In step S313, the real-time CPU 12 executing the application activation/termination control program 163 of the operating system 141 terminates the processing of the limited-function user interface by terminating the GUI processing program 172 of the application program 142, and the activation processing by a warm boot terminates.

In this way, the activation processing by a warm boot enables a quick transition from a paused state to the initial state S0N.

Figure 17:
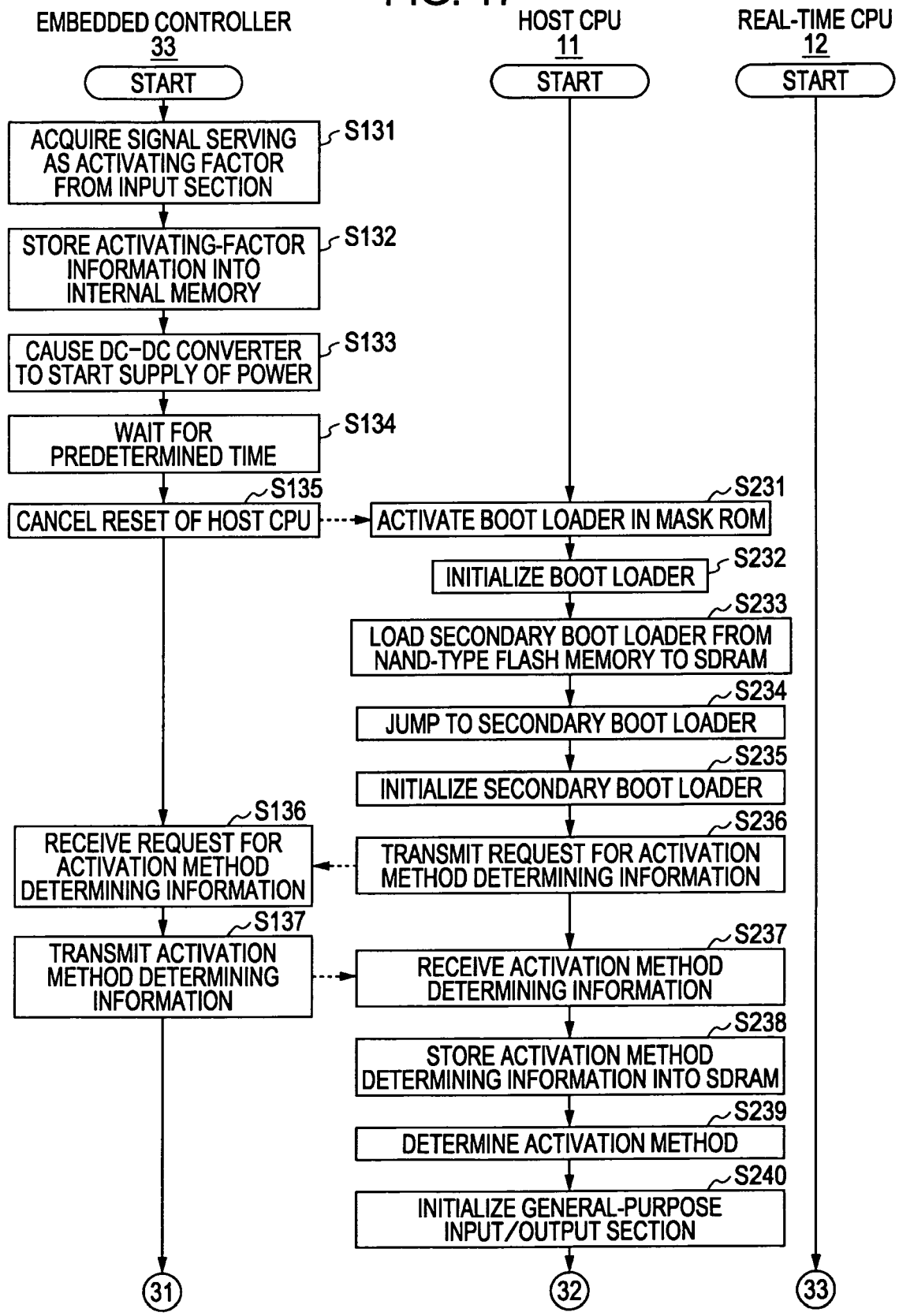
FIG. 17 is a flow chart illustrating the details of activation processing by a hot boot.
Figure 18:
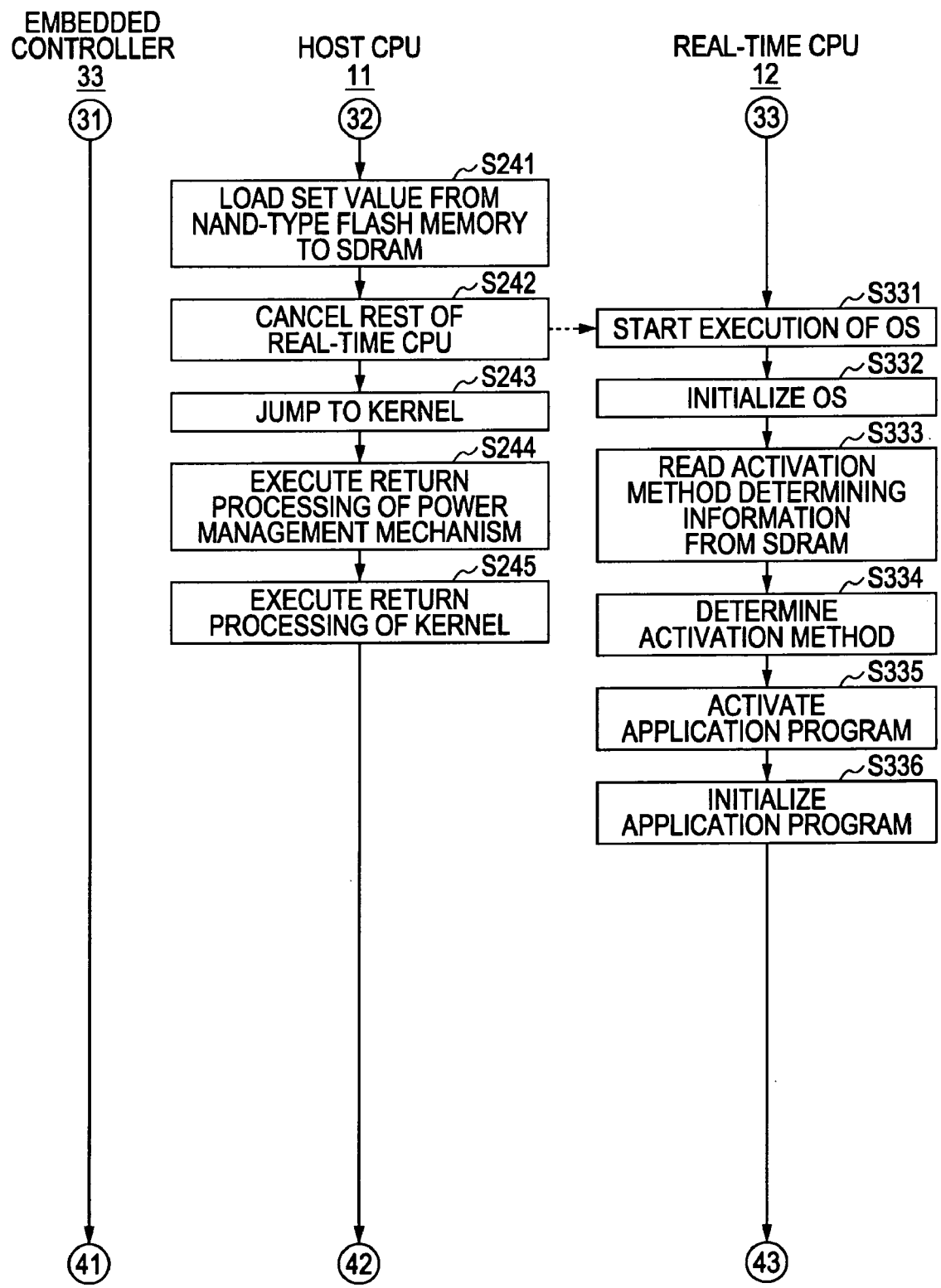
FIG. 18 is a flow chart illustrating the details of activation processing by a hot boot.
Figure 19:
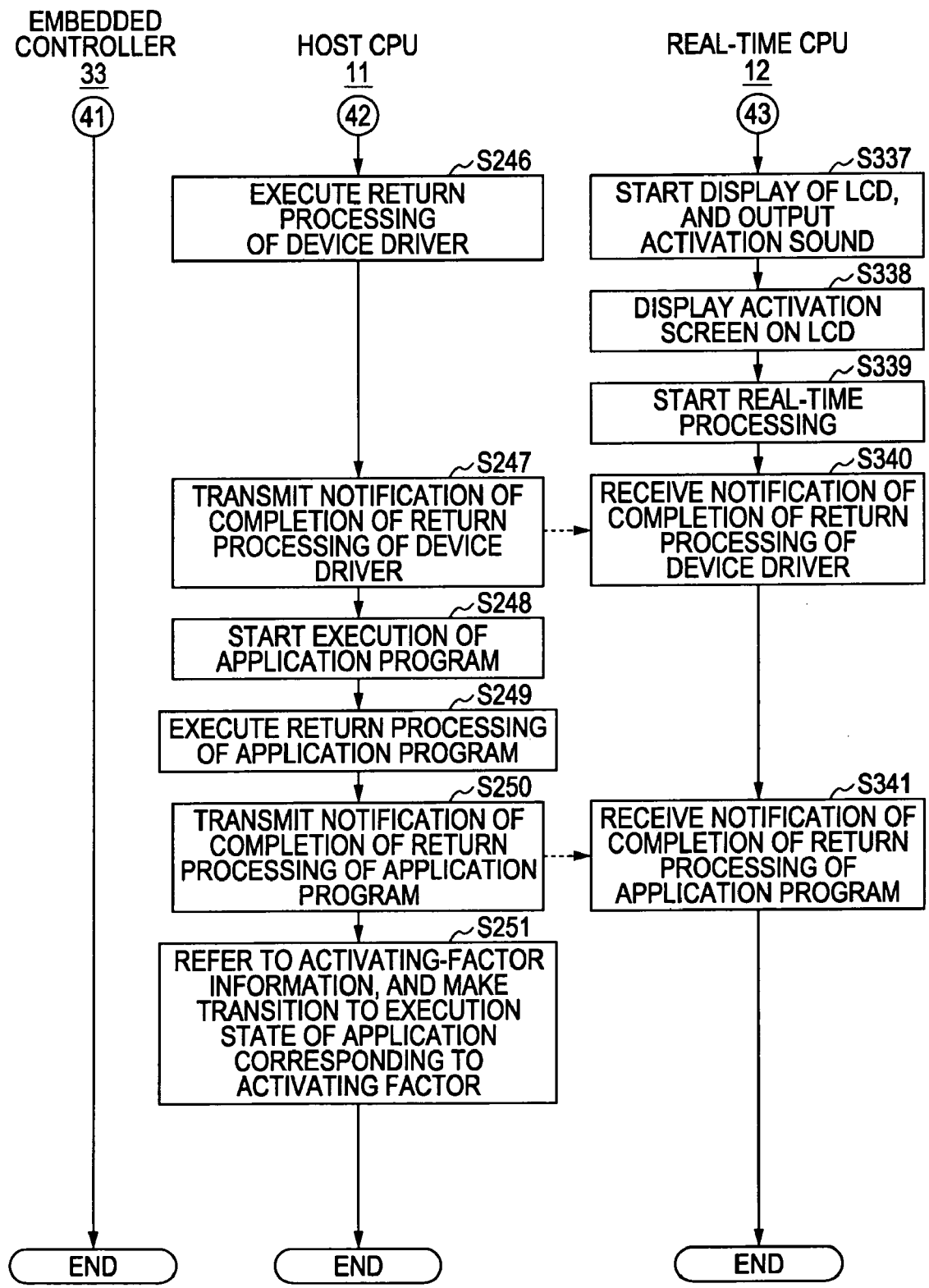
FIG. 19 is a flow chart illustrating the details of activation processing by a hot boot.

Next, referring to a flow chart of FIGS. 17 to 19, activation processing by a hot boot will be described in detail.

Since steps S131 to S137 executed by the embedded controller 33 are respectively the same as steps S101 to S107 in FIG. 14, description thereof is omitted.

Since steps S231 to S238 executed by the host CPU 11 are respectively the same as steps S201 to S208 in FIG. 14, description thereof is omitted.

In step S239, the host CPU 11 executing the activation method determination program 122 of the secondary boot loader 101 determines the method of activation on the basis of the activation method determining information acquired by the reception in step S237. In this case, the method of activation is determined to be the method of activation by a hot boot. It should be noted that if the paused state information indicates the suspend state S3 and the battery attachment/detachment information indicates that the battery has not been detached, the activation method determination program 122 determines the method of activation to be the method of activation by a hot boot.

Since steps S240 and S241 executed by the host CPU 11 are respectively the same as steps S210 and S211 in FIG. 14 or 15, description thereof is omitted.

In step S242, the host CPU 11 executing the secondary boot loader 101 cancels the reset of the real-time CPU 12.

Since steps S331 to S333 executed by the real-time CPU 12 are respectively the same as steps S301 to S303 in FIG. 15, description thereof is omitted.

In step S334, the real-time CPU 12 executing the activation method determination program 162 of the operating system 141 determines the method of activation through the same processing as in step S239, on the basis of the activation method determining information read in step S333. In this case, the method of activation is determined to be the method of activation by a hot boot.

Since steps S335 to S338 executed by the real-time CPU 12 are respectively the same as steps S305 to S308 in FIG. 15 or 16, description thereof is omitted.

In step S339, the real-time CPU 12 executing the real-time processing program 171 of the application program 142 starts real-time control processing with respect to the optical system (not shown), the CCD 14, the analog front end 15, and the signal processing section 16.

That is, in this case, the execution of the GUI processing program 172 by the real-time CPU 12 is suppressed. Accordingly, the execution of processing of a user interface through which a user instruction is acquired from the input section 31 that the real-time CPU 12 shares with the host CPU 11 and which provides a small number of functions in comparison to the functions of the application program 62, that is, a limited-function user interface, is suppressed.

In the case of activation by a hot boot, since the host CPU 11 activates very fast, configuring the real-time CPU 12 not to execute the GUI processing program 172 actually leads to faster activation.

In parallel with steps S331 to S339 executed by the real-time CPU 12, steps S243 to S246 are executed by the host CPU 11. That is, in step S243, the host CPU 11 executes an instruction for a jump to the kernel 71, which is an instruction included in the secondary boot loader 101, so the procedure jumps to the kernel 71. As a result, the host CPU 11 starts execution of the operating system 61.

Since steps S244 to S246 executed by the host CPU 11 are respectively the same as steps S216 to S218 in FIG. 15 or 16, description thereof is omitted.

Further, since steps S247 to S250 executed by the host CPU 11 are respectively the same as steps S219 to S222 in FIG. 16, description thereof is omitted. Further, since steps S340 to S341 executed by the real-time CPU 12 are respectively the same as steps S311 to S341 in FIG. 16, description thereof is omitted.

In step S251 after step S250, the host CPU 11 executing the state transition processing program 85 of the application program 62 refers to the activating-factor information of the activation method determining information stored in the SDRAM 29, and causes the state of the digital still camera to transition to the execution state of an application corresponding to an activating factor, and the activation processing by a hot boot terminates. For example, if, in step S251, the activating factor is the depression of the power button of the input section 31, the state transition processing program 85 activates the browse processing program 82, and causes the state of the digital still camera to transition to the browse processing execution state. Further, for example, if, in step S251, the activating factor is the opening of the lens cap, the state transition processing program 85 activates the photographic processing program 81, and causes the state of the digital still camera to transition to the photographic processing execution state.

In this way, the activation processing by a hot boot enables very fast activation, and also a transition to, of the active state S0, a state of executing processing corresponding to an activating factor.

Figure 20:
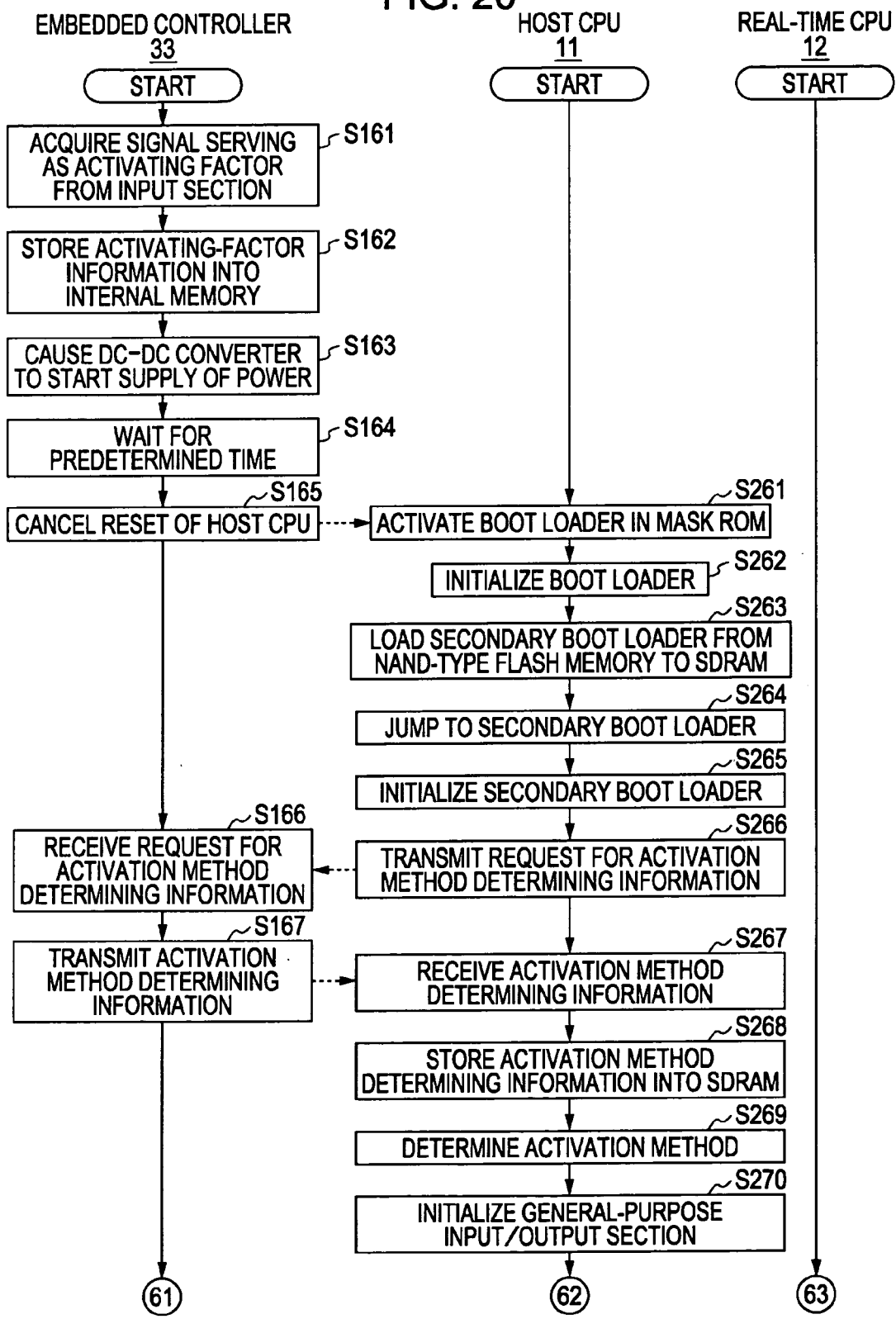
FIG. 20 is a flow chart illustrating the details of activation processing by a cold boot.
Figure 21:
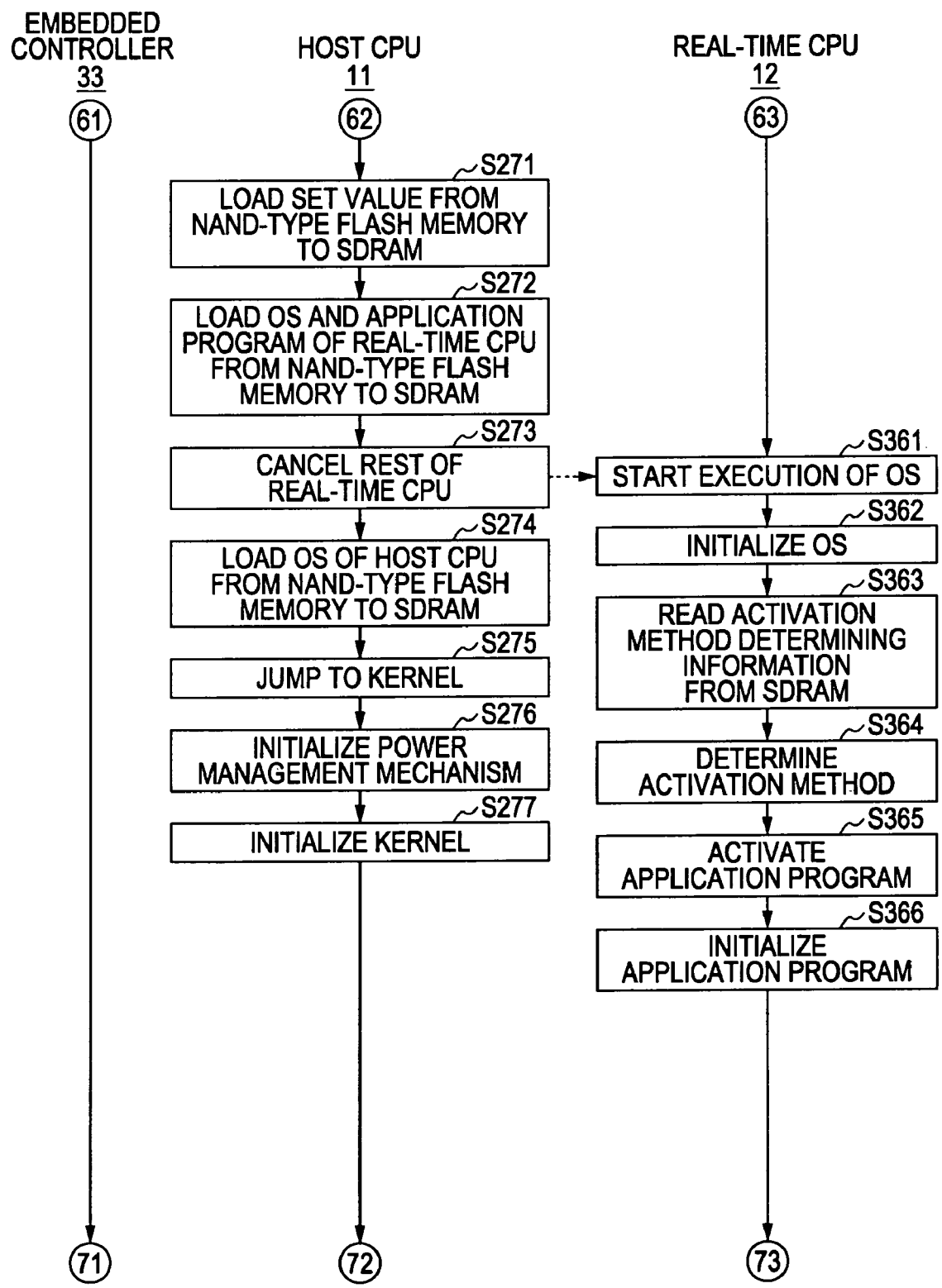
FIG. 21 is a flow chart illustrating the details of activation processing by a cold boot.
Figure 22:
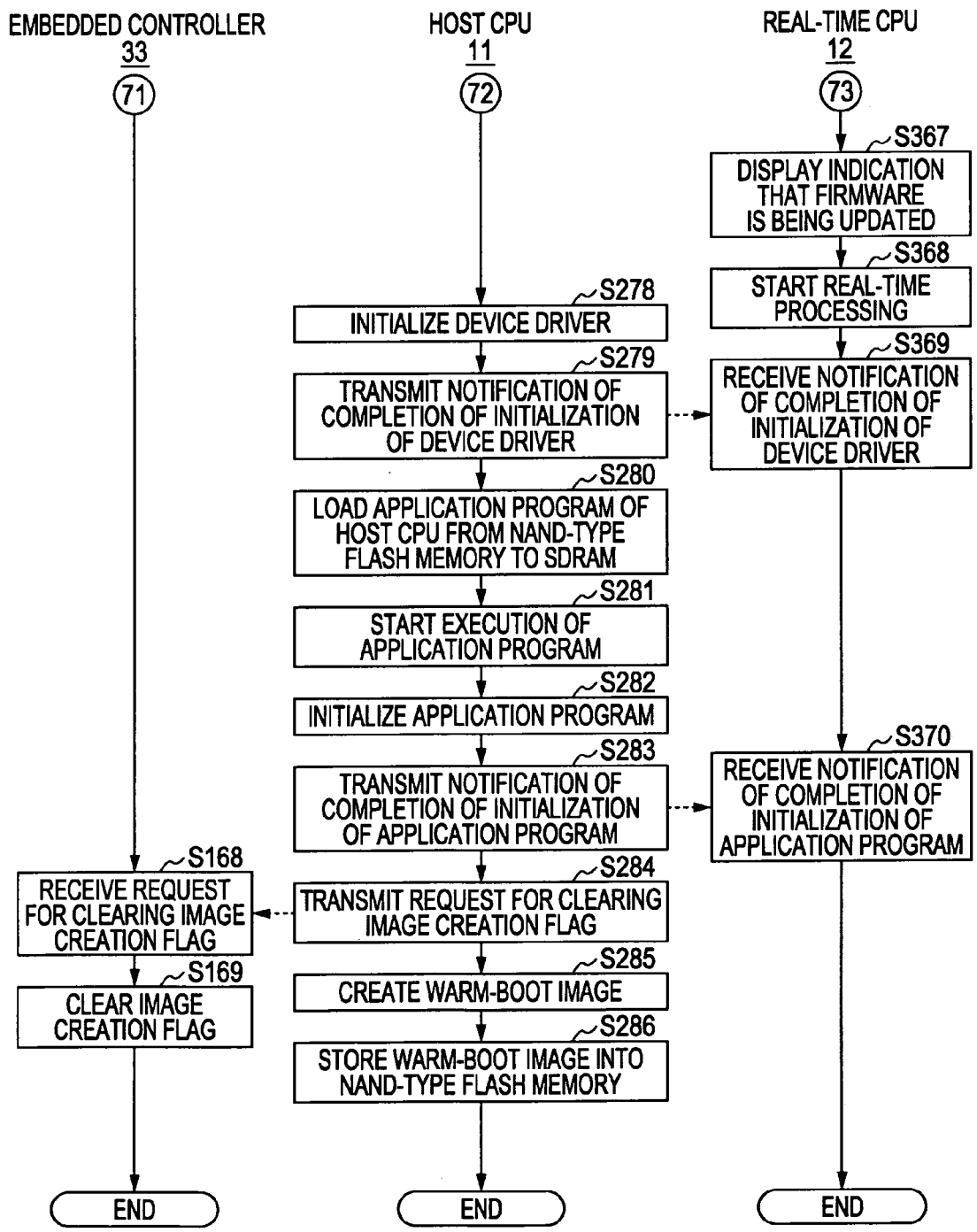
FIG. 22 is a flow chart illustrating the details of activation processing by a cold boot.

Next, referring to a flow chart shown in FIGS. 20 to 22, description will be given of the details of activation processing by a cold boot, which is executed in a factory prior to shipping a digital still camera, or executed when updating so-called firmware.

Since steps S161 to S167 executed by the embedded controller 33 are respectively the same as steps S101 to S107 in FIG. 14, description thereof is omitted.

Since steps S261 to S268 executed by the host CPU 11 are respectively the same as steps S201 to S208 in FIG. 14, description thereof is omitted.

In step S269, the host CPU 11 executing the activation method determination program 122 of the secondary boot loader 101 determines the method of activation on the basis of the activation method determining information acquired by the reception in step S267. In this case, the method of activation is determined to be the method of activation by a cold boot.

For example, in step S269, the host CPU 11 executing the activation method determination program 122 refers to an image creation flag included in the paused state information, and if the image creation flag is set, that is, if the image creation flag is standing up, this means that it is necessary to create a warm-boot image, so the method of activation is determined to be the method of activation by a cold boot.

It should be noted that the image creation flag is set in pause processing described later when, for example, updated firmware is acquired, and updating of firmware is instructed by the user.

Since steps S270 to S273 executed by the host CPU 11 are respectively the same as steps S210 to 213 in FIG. 14 or 15, description thereof is omitted.

Since steps S361 to S363 executed by the real-time CPU 12 are respectively the same as steps S301 to S303 in FIG. 15, description thereof is omitted.

In step S364, the real-time CPU 12 executing the activation method determination program 162 of the operating system 141 determines the method of activation through the same processing as in step S269, on the basis of the activation method determining information read in step S363. In this case, the method of activation is determined to be the method of activation by a cold boot.

Since steps S365 and S366 executed by the real-time CPU 12 are respectively the same as steps S305 and S306 in FIG. 15, description thereof is omitted.

In step S367, the real-time CPU 12 executing the application program 142 controls the graphic controller 21 to display on the LCD 20 an indication that firmware is being updated.

The user can thus learn that updating of firmware is being performed.

If the control of a display indicating that firmware is being updated is performed by the host CPU 11, a warm-boot image for displaying an indication that firmware is being updated is generated. However, since the control of a display indicating that firmware is being updated is performed by the real-time CPU 12, even when activation processing by a warm boot is executed by using the generated warm-boot image, an indication that firmware is being updated is not displayed.

In step S368, the real-time CPU 12 executing the real-time processing program 171 of the application program 142 starts real-time control processing with respect to the optical system (not shown), the CCD 14, the analog front end 15, and the signal processing section 16.

That is, in this case, the execution of the GUI processing program 172 by the real-time CPU 12 is suppressed. Accordingly, the execution of processing of a user interface through which a user instruction is acquired from the input section 31 that the real-time CPU 12 shares with the host CPU 11 and which provides a small number of functions in comparison to the functions of the application program 62, that is, a limited-function user interface, is suppressed. Further, in this case, execution of the activation screen display program 173 by the real-time CPU 23 is suppressed. Accordingly, display of the activation screen indicating activation on the LCD 20 is suppressed.

In parallel with steps S361 to S368 executed by the real-time CPU 12, steps S274 to S278 are executed by the host CPU 11. That is, in step S274, the host CPU 11 executing the secondary boot loader 101 loads the operating system 61 from the NAND-type flash memory 17 to the SDRAM 29.

In step S275, the host CPU 11 executes an instruction for a jump to the kernel 71, which is an instruction included in the secondary boot loader 101, so the procedure jumps to the kernel 71. As a result, the host. CPU 11 starts execution of the operating system 61.

In step S276, the host CPU 11 executing the power management mechanism 73 of the operating system 61 detects the state of power sources including the DC-DC converter 34 and the battery 35, and initializes the power management mechanism 73 by, for example, initializing internal parameters in accordance with the detected state of power sources.

In step S277, the host CPU 11 executing the kernel 71 of the operating system 61 detects the state of occupancy of the storage space of the SDRAM 29 or the like, and initializes the kernel 71 by, for example, initializing parameters of the management process of the resources of the SDRAM 29 or the like.

In step S278, the host CPU 11 executing the operating system 61 detects each of devices such as the signal processing section 16, the serial interface 19, the graphic controller 21, the memory card interface 23, the controller 25, the IDE interface 28, and the general-purpose input/output section 32, and also the state of the device, and initializes the device driver 72 by, for example, initializing the parameters of the device driver 72 in accordance with the detection result.

In step S279, the host CPU 11 executing the operating system 61 transmits a notification of the completion of initialization of the device driver 72 to the real-time CPU 12 via the bus.

In step S369, the real-time CPU 12 executing the operating system 141 receives the notification of the completion of initialization of the device driver 72, which is transmitted from the host CPU 11, via the bus.

In step S280, the host CPU 11 executing the operating system 61 loads the application program 62 from the NAND-type flash memory 17 to the SDRAM 29. In step S281, the host CPU 11 executing the operating system 61 starts execution of the application program 62.

In step S282, the host CPU 11 initializes the application program 62. It should be noted that after step S282, the state enters the initial state S0N.

In step S283, the host CPU 11 transmits a notification of the completion of initialization of the application program 62 to the real-time CPU 12 via the bus.

In step S370, the real-time CPU 12 receives the notification of the completion of initialization of the application program 62, which is transmitted from the host CPU 11, via the bus.

In step S284, the host CPU 11 executing the paused state information providing program 75 transmits a request for clearing an image creation flag to the embedded controller 33 via the serial interface 19.

In step S168, the embedded controller 33 executing the activation-method-determining-information acquiring program 203 receives the request for clearing an image creation flag, which is transmitted from the host CPU 11, via the serial interface 19.

In step S169, the embedded controller 33 executing the activation-method-determining-information storage processing program 204 clears the image creation flag included in the paused state information.

In step S285, the host CPU 11 executing the warm-boot-image generating program 78 of the operating system 61 reads the program and data stored in the SDRAM 29 to generate a warm-boot image. That is, the warm-boot-image generating program 78 generates a warm-boot image by using the program and data loaded to the SDRAM 29 in the initial state S0N of the active state S0 as they are as the data of the warm-boot image.

In step S286, the host CPU 11 executing the warm-boot-image generating program 78 of the operating system 61 stores the warm-boot image generated in step S285 into the NAND-type flash memory 17, and the activation processing by a cold boot terminates. For example, in step S268, the warm-boot-image generating program 78 stores the generated warm-boot image to the NAND-type flash memory 17 in such a way that the generated warm-boot image is written over the warm-boot image that has been stored in the NAND-type flash memory 17.

In this way, through the activation processing by a cold boot, a warm-boot image including updated firmware is generated and stored into the NAND-type flash memory 17.

It should be noted that the termination processing described below may be executed immediately after step S286.

A configuration may also be adopted in which, after confirming that a warm-boot image has been generated properly, the host CPU 11 transmits a request for clearing an image creation flag to the embedded controller 33 via the serial interface 19, and the embedded controller 33 receives the request for clearing the image creation flag, and clears the image creation flag included in the paused state information. This means that the image creation flag is cleared only when a warm-boot image has been generated properly. That is, a warm-boot image can be generated more reliably.

It is a matter of course that, likewise, the image creation flag may be cleared only after a warm-boot image has been properly stored into the NAND-type flash memory 17.

Furthermore, the image creation flag may be cleared in the following case. That is, after activation processing by a cold boot is completed, a pause is entered, and then activation is done by a warm boot by using the warm-boot image generated in step S285. The image creation flag may be cleared if this activation has been performed properly. In this way, the image creation flag is cleared only when activation has been performed properly by using a warm-boot image.

For example, the following configuration is possible. That is, when a warm-boot image is generated, an image-generation completion flag, which is included in the paused state information together with the image creation flag and indicates whether or not a warm-boot image has been generated, is set so as to indicate that a warm-boot image has been generated. Next, when activating, reference is made to the image-generation completion flag that has been set and the image creation flag that has been set, the method of activation is determined to be the method of activation by a warm boot, and after return processing of the operating system 61 is completed, and return processing of the application program 62 is completed, the image-generation completion flag and the image creation flag may be cleared.

It should be noted that in a case where the image creation flag and the image-generation completion flag are used, when the image-generation completion flag is reset, and the image creation flag is set, the method of activation is determined to be the method of activation by a cold boot, and when the image-generation completion flag is reset, and the image creation flag is reset, the method of activation is determined on the basis of the paused state that was determined when entering a pause, and the history of attachment/detaching of the battery 35 in the paused state.

Next, referring to a flow chart of FIG. 23, an example of pause processing will be described.

In step S501, the host CPU 11 executing the state transition processing program 85 of the application program 62 causes the execution of the photographic processing program 81, the browse processing program 82, the setting processing program 83, or the USB mass-storage processing program 84 to terminate, thereby causing the state of the digital still camera to transition to the initial state S0N of the active state S0.

In step S501, the host CPU 11 executing the paused state determination program 74 of the operating system 61 determines the paused state to which a transition is to be made.

That is, the paused state determination program 74 determines the paused state to which a transition is to be made to be one of the suspend state S3 and hibernation S4.

For example, in step S502, if the output voltage of the battery 35 is equal to or higher than a predetermined threshold, and the power button of the input section 31 has been depressed, or if the output voltage of the battery 35 is equal to or higher than a predetermined threshold, and the lens cap has been closed, the paused state determination program 74 determines the paused state to which a transition is to be made to the suspend state S3.

For example, in step S502, if the output voltage of the battery 35 is less than a predetermined threshold, or if the power button has been depressed for a time longer than a predetermined time, the paused state determination program 74 determines the paused state to which a transition is to be made to the hibernation S4.

In step S503, the host CPU 11 executing the paused state information providing program 75 of the operating system 61 transmits the paused state to which a transition is to be made to the embedded controller 33 via the serial interface 19.

In step S601, the embedded controller 33 executing the activation-method-determining-information acquiring program 203 receives the paused state information transmitted from the host CPU 11, via the serial interface 19. In step S602, the embedded controller 33 executing the activation-method-determining-information storage processing program 204 stores the paused state information received in step S601 into the internal memory of the embedded controller 33.

It should be noted that if updated firmware, that is, the operating system 61 or the application program 62 is acquired, and updating of firmware is instructed by the user, in step S503, paused state information including a set image creation flag is transmitted. In step S601, the paused state information including the set image creation flag is received, and in step S602, the paused state information including the set image creation flag is stored into the internal memory of the embedded controller 33.

On the other hand, if updated firmware is not acquired, or if updating of firmware is not instructed by the user even through updated firmware has been acquired, in step S503, paused state information including a cleared image creation flag is transmitted. In step S601, the paused state information including the cleared image creation flag is received, and in step S602, the paused state information including the cleared image creation flag is stored into the internal memory of the embedded controller 33.

In step S603, the embedded controller 33 executing the battery attachment/detachment detecting program 206 detects the attachment/detachment of the battery 35 by detecting the output voltage of the DC-DC converter 34. Then, the embedded controller 33 executing the activation-method-determining-information acquiring program 203 generates battery attachment/detachment information corresponding to the detection result of attachment/detachment of the battery 35.

In step S604, the embedded controller 33 executing the activation-method-determining-information storage processing program 204 stores the battery attachment/detachment information corresponding to the detection result of attachment/detachment of the battery 35 into its internal memory. That is, in step S604, if the battery 35 is detached, the activation-method-determining-information storage processing program 204 stores battery attachment/detachment information indicating that the battery 35 has been detached into its internal memory, and if the battery 35 is attached, the activation-method-determining-information storage processing program 204 stores battery attachment/detachment information indicating that the battery 35 is not detached (has not been detached) into its internal memory.

On the other hand, in step S504, the host CPU 11 executing the application program 62 executes termination processing of the application program 62. For example, in step S504, the application program 62 executes such termination processing as closing the file in which data of a photographed image is stored.

In step S505, the host CPU 11 executing the application program 62 transmits a notification of termination to the real-time CPU 12 via the bus.

In step S701, the real-time CPU 12 executing the operating system 141 receives the notification of termination transmitted from the host CPU 11, via the bus.

In step S702, the real-time CPU 12 executing the operating system 141 and the application program 142 executes termination processing. In step S703, the real-time CPU 12 executing the operating system 141 transmits a notification of start of termination processing to the host CPU 11 via the bus.

For example, in step S702, the real-time processing program 171 of the application program 142 returns the lens constituting the optical system (not shown) to the end position.

In step S506, the host CPU 11 executing the application program 62 receives the notification of start of termination processing transmitted from the real-time CPU 12, via the bus.

Then, when the termination processing of the real-time CPU 12 is completed, in step S704, the real-time CPU 12 executing the operating system 141 transmits a notification of completion of termination processing to the host CPU 11 via the bus. Thus, in step S507, the host CPU 11 executing the operating system 61 receives the notification of completion of termination processing transmitted from the real-time CPU 12, via the bus.

It should be noted that after transmitting the notification of completion of termination processing to the host CPU 11, the real-time CPU 12 is reset by control from the host CPU 11 that has received the notification of completion of termination processing, and the reset state is maintained, or the real-time CPU 12 executes an infinite loop instruction.

In step S508, the host CPU 11 executing the set value storage processing program 77 of the operating system 61 stores set values required for a return operation at activation, into the NAND-type flash memory 17. The set values to be stored into the NAND-type flash memory 17 are those indicating the shutter speed and exposure, zoom, and the size of an image to be photographed and compression ratio used for encoding, or the values of internal registers of the host CPU 11. Further, the set values to be stored into the NAND-type flash memory 17 in step S508 include the values of internal registers of the real-time CPU 12 and the values of registers of the internal interface of the real-time CPU 12, which are stored in the SDRAM 29 and managed as variables of the operating system 141 and application program 142.

In step S509, the host CPU 11 executing the operating system 61 executes termination processing of the device driver 72. That is, the operating system 61 executes termination processing of the device driver 72, such as terminating the process for controlling devices such as the signal processing section 16, the serial interface 19, the graphic controller 21, the memory card interface 23, the controller 25, the IDE interface 28, and the general-purpose input/output section 32.

As a part of the termination processing of the device driver 72, in step S510, the host CPU 11 executing the other-CPU-program reading program 76 of the operating system 61 loads the operating system 141 and application program 142 of the real-time CPU 12 from the NAND-type flash memory 17 to the SDRAM 29.

Accordingly, when activation processing by a hot boot is executed next time, there is no need to load the operating system 141 and the application program 142 to the SDRAM 29 in the activation processing, thus allowing faster activation.

While the real-time CPU 12 is executing the termination processing, the operating system 141 and the application program 142 are executed, and internal variables and the like of the operating system 141 and application program 142 are changed. Therefore, loading of the operating system 141 and application program 142 to the SDRAM 29 is performed after the termination processing of the real-time CPU 12 is completed.

It should be noted that in a case where, before loading the operating system 141 and application program 142 of the real-time CPU 12 from the NAND-type flash memory 17 to the SDRAM 29, the host CPU 11 resets the real-time CPU 12, and causes the reset state of the real-time CPU 12 to be maintained, as compared with a case where the host CPU 11 causes the real-time CPU 12 to execute an infinite loop instruction, the operating system 141 and the application program 142 can be more safety loaded to the SDRAM 29 and executed at activation. That is, it is possible to reduce the possibility of the operating system 141 and the application program 142 loaded to the SDRAM 29 being changed by the real-time CPU 12 before they are activated next time.

In a case where the real-time CPU 12 is not set to a reset state, and the real-time CPU 12 is caused to execute an infinite loop instruction, the infinite loop instruction to be executed by the real-time CPU 12 is stored in a storage area other than the storage area into which the operating system 141 and the application program 142 are loaded. For example, the real-time CPU 12 executes an infinite loop instruction stored in a storage area of the SDRAM 29 other than the storage area into which the operating system 141 and the application program 142 are loaded, or an infinite loop instruction stored in the mask ROM 13.

As described above, when the real-time CPU 12 completes termination processing, the reset time of the real-time CPU 12 is maintained, or the real-time CPU 12 executes an infinite loop instruction. It is thus possible to prevent the operating system 141 and the application program 142 loaded to the SDRAM 29 from being changed before they are activated next time by a hot boot.

It should be noted that in step S502, the process may skip to step S510 if the paused state is determined to be the hibernation S4.

When the termination processing of the device driver 72 is completed, in step S511, the host CPU 11 executing the operating system 61 executes termination processing of the kernel 71. For example, in step S511, the operating system 61 completes a predetermined process, such as the monitoring of the application program 62 and devices, management of the resources of the SDRAM 29 and the like, or inter-process communication.

When the termination processing of the kernel 71 is completed, in step S512, the host CPU 11 executing the operating system 61 executes termination processing of the power management mechanism 73 such as setting parameters for a paused state.

In step S513, the host CPU 11 executing the power management mechanism 73 of the operating system 61 transmits a request for stopping supply of power to the embedded controller 33 via the serial interface 19.

In step S605, the embedded controller 33 executing the power control program 201 receives the request for stopping supply of power transmitted from the host CPU 11, via the serial interface 19.

In step S606, the embedded controller 33 executing the power control program 201 causes the DC-DC converter 34 to stop supply of power, and the processing terminates. For example, in step S606, the power control program 201 refers to the paused state information stored in the internal memory of the embedded controller 33. In the case of a transition to the suspend state S3, the embedded controller 33 causes the DC-DC converter 34 to stop (shut off) the supply of power to the host CPU 11 and the real-time CPU 12 while keeping the supply of power to the SDRAM 29 as it is, and in the case of a transition to the hibernation S4, the embedded controller 33 causes the DC-DC converter 34 to stop (shut off) the supply of power to the SDRAM 29, the host CPU 11, and the real-time CPU 12.

In this way, after a paused state is determined, and paused state information indicating the determined paused state is stored into the internal memory of the embedded controller 33, the state of the digital still camera is allowed to transition to the determined paused state. Further, prior to a transition to the paused state, set values required for a return operation at activation are stored into the NAND-type flash memory 17.

Furthermore, prior to a transition to the suspend state S3, the operating system 141 and application program 142 of the real-time CPU 12 are loaded to the SDRAM 29.

It should be noted that in a case where the operating system 141 and application program 142 of the real-time CPU 12 are loaded to the SDRAM 29 prior to a transition to the suspend state S3, in step S332 described above, the real-time CPU 12 reads from the SDRAM 29 the values of internal registers of the real-time CPU 12 or the values of registers of the internal interface of the real-time CPU 12, which are included in the set values loaded to the SDRAM 29 in the processing of step S241 and are values in the state before entering a pause, and sets the values to the internal registers of the real-time CPU 12 or the registers of the internal interface of the real-time CPU 12.

In this way, the operating system 141 is executed substantially after correct values are set to the internal registers of the real-time CPU 12 and the registers of the internal interface of the real-time CPU 12. This prevents the real-time CPU 12 from going haywire, or the operating system 141 and the application program 142 loaded to the SDRAM 29 from being destructed before a transition is made to the suspend state S3, so the operating system 141 and the application program 142 are executed properly with reliability.

Figure 24:
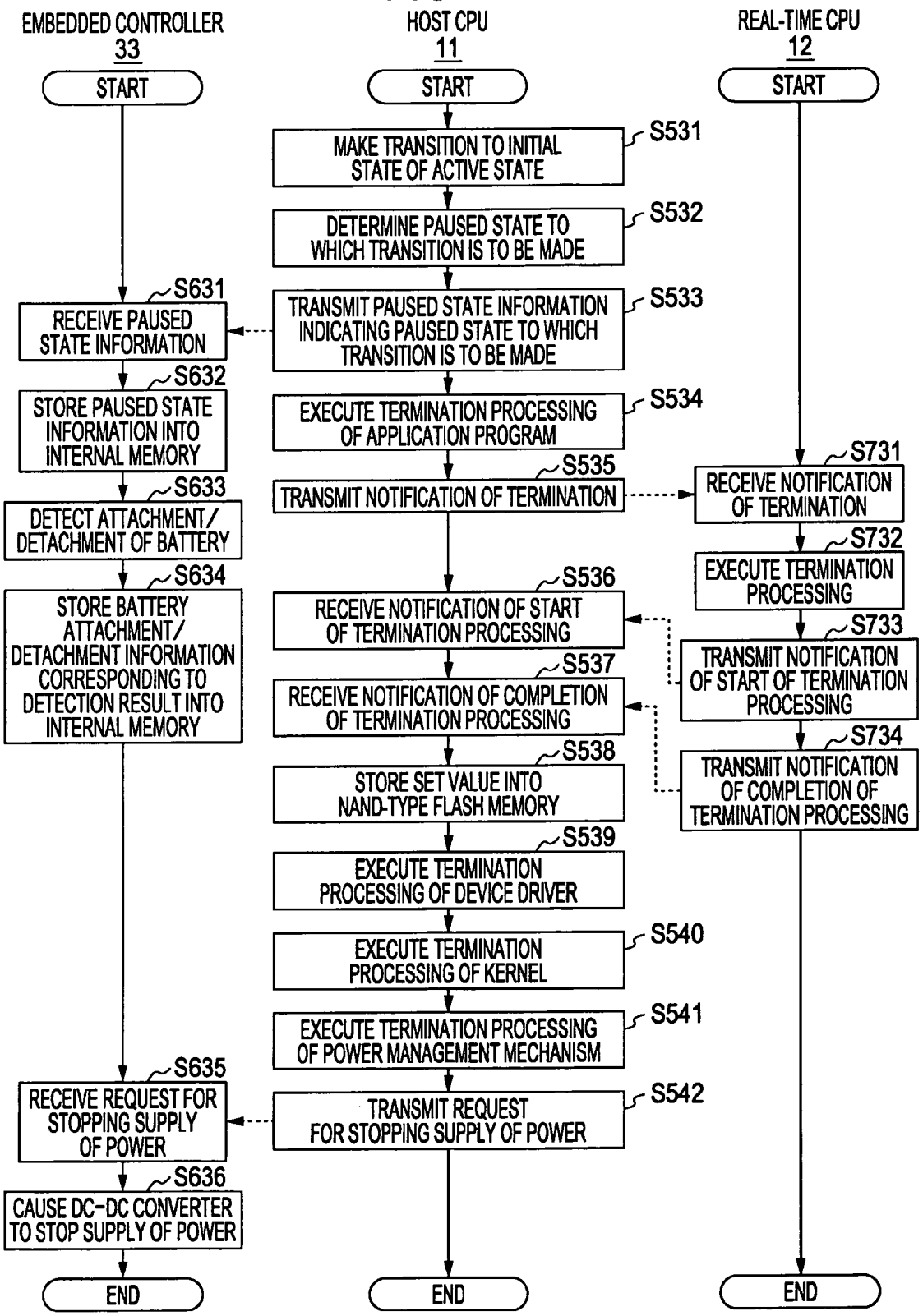
FIG. 24 is a flow chart illustrating another example of pause processing.

FIG. 24 is a flow chart showing another example of pause processing.

Since steps S531 to S539, steps S631 to S634, and steps S731 to S734 are respectively the same as steps S501 to S509, steps S601 to S604, and steps S701 to S704 in FIG. 23, description thereof is omitted.

In the termination processing of the device driver 72 during the pause processing shown in the flow chart of FIG. 24, the operating system 141 and application program 142 of the real-time CPU 12 are not loaded to the SDRAM 29.

Since steps S540 to S542, and steps S635 and S636 are respectively the same as steps S511 to S513, and steps S605 and S606 in FIG. 23, description thereof is omitted.

In this way, the operating system 141 and application program 142 of the real-time CPU 12 may not be loaded to the SDRAM 29 in the termination processing of the device driver 72.

Since it takes a predetermined period of time to load the operating system 141 and the application program 142 to the SDRAM 29, if loading of the operating system 141 and the application program 142 to the SDRAM 29 is not performed, pause processing can be accomplished in a shorter time.

It should be noted that the set values to be stored into the NAND-type flash memory 17 in step S538 do not include the values of internal registers of the real-time CPU 12 and the values of registers of the internal interface of the real-time CPU 12, which are stored in the SDRAM 29 and managed as variables of the operating system 141 and application program 142.

It is thus possible to reduce the storage capacity of the storage area of the NAND-type flash memory 17 required for the storage of set values.

Further, in a case where the activation processing by a hot boot described above with reference to the flow chart of FIGS. 17 to 19 is executed after the pause processing shown in the flow chart of FIG. 24, prior to step S242, the host CPU 11 executing the other-CPU-program reading program 124 of the secondary boot loader 101 loads the operating system 141 and application program 142 of the real-time CPU 12 from the NAND-type flash memory 17 to the SDRAM 29.

Next, description will be given of the storage processing of a history of detachment of the battery 35, which is executed at every predetermined period by the embedded controller 33, which is supplied with power from the DC-DC converter 34 in a paused state and is supplied with electric power from the battery 36 in the mechanical off state G3.

Figure 25:
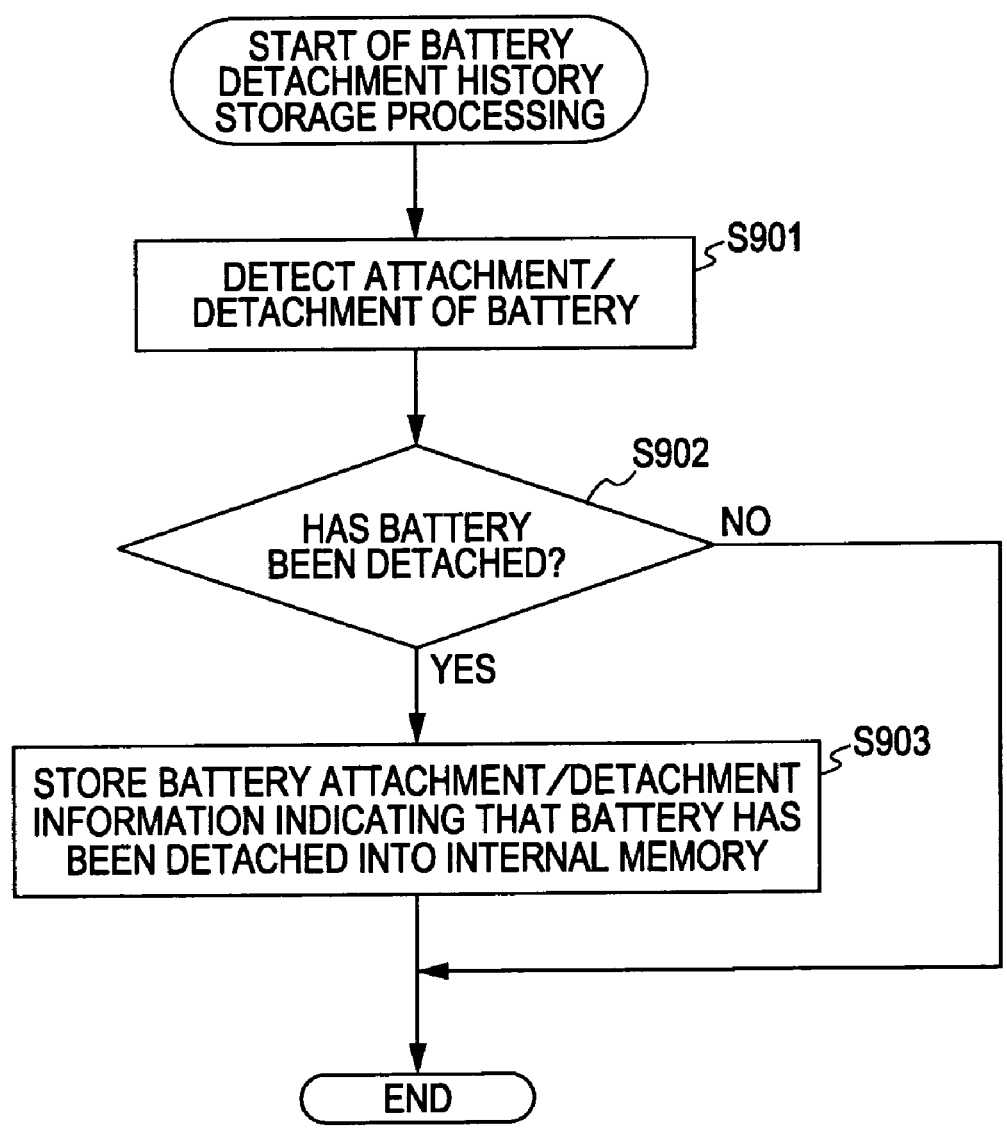
FIG. 25 is a flow chart illustrating the storage processing of a history of detachment of a battery.

FIG. 25 is a flow chart illustrating the storage processing of a history of detachment of the battery 35. In step S901, the embedded controller 33 executing the battery attachment/detachment detecting program 206 detects attachment/detachment of the battery 35 by detecting the output voltage of the DC-DC converter 34. For example, in step S901, the battery attachment/detachment detecting program 206 detects attachment or detachment of the battery 35 by comparing the output voltage of the DC-DC converter 34 and a predetermined threshold against each other.

In step S902, the embedded controller 33 executing the activation-method-determining-information storage processing program 204 determines whether or not the battery 35 has been detached. If it is determined in step S902 that the battery 35 has been detached, the procedure proceeds to step S903. In step S903, the embedded controller 33 executing the activation-method-determining-information storage processing program 204 stores battery attachment/detachment information indicating that the battery 35 has been detached into its internal memory, and the processing terminates. That is, if the battery 35 has been detached, the battery attachment/detachment information stored in the embedded controller 33 is updated so as to indicate that the battery 35 has been detached.

If it is determined in step S902 that the battery 35 has not been detached, there is no need to update the battery attachment/detachment information stored in the embedded controller 33, so step S903 is skipped, and the processing terminates.

In this way, when the battery 35 is detached in a paused state, battery attachment/detachment information is updated so as to indicate that the battery 35 has been detached. The battery attachment/detachment information thus indicates the history of attachment/detachment of the battery 35 in a paused state.

In this regard, the following configuration may also be adopted. That is, in step S901, the embedded controller 33 executing the battery attachment/detachment detecting program 206 detects the stoppage of supply of power from an external power source by detecting the output voltage of the DC-DC converter 34, and in step S902, the embedded controller 33 executing the activation-method-determining-information storage processing program 204 determines whether or not supply of power from the external power source has been stopped. If it is determined that supply of power from the external power source has been stopped, in step S903, the embedded controller 33 executing the activation-method-determining-information storage processing program 204 stores battery attachment/detachment information indicating that supply of power from the external power source has been stopped, into its internal memory. That is, in this case, the battery attachment/detachment information indicates the history of supply of power from the external power source.

Further, the following configuration may be adopted as well. That is, in step S901, the embedded controller 33 executing the battery attachment/detachment detecting program 206 detects the stoppage of supply of power from an external power source and attachment/detachment of the battery 35 by detecting the output voltage of the DC-DC converter 34, and in step S902, the embedded controller 33 executing the activation-method-determining-information storage processing program 204 determines whether or not supply of power from the external power source has been stopped and the battery 35 has been detached. If it is determined that supply of power from the external power source has been stopped and the battery 35 has been detached, in step S903, the embedded controller 33 executing the activation-method-determining-information storage processing program 204 stores battery attachment/detachment information indicating that supply of power from the external power source has been stopped and the battery 35 has been detached, into its internal memory.

That is, battery attachment/detachment information is an example of information indicating the history of stoppage of supply of power for maintaining the suspend state S3, in an active state. Further, in this case, the battery attachment/detachment detecting program 206 detects the stoppage of supply of power for maintaining the suspend state S3, in a paused state.

Figure 26:
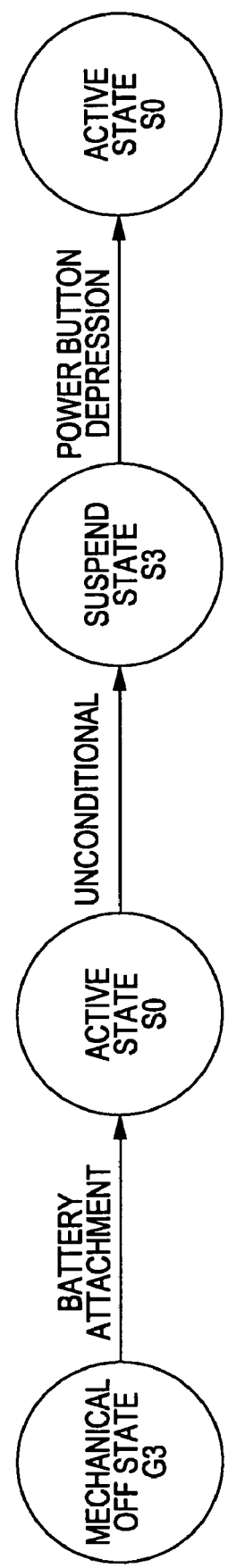
FIG. 26 is a diagram showing an example of state transition at activation.

It should be noted that as shown in FIG. 26, a configuration may be adopted in which, when the battery 35 is attached in the mechanical off state G3, with this attachment of the battery 35 as an activation trigger, the digital still camera is activated in accordance with the method of activation by a cold boot or warm boot so that the state of the digital still camera transitions to the active state S0, and then the state unconditionally transitions from this active state S0 to the suspend state S3. In this case, an activation screen is not displayed, and activation sound is not outputted, either.

Accordingly, even in a case where activation processing by a cold boot or warm boot takes a long time, the digital still camera can be paused in the suspend state S3 by simply attaching the battery 35 without the user being aware of it.

Then, when the power button is depressed while in the suspend state S3, the digital still camera is activated according to the method of activation by a hot boot so as to transition to the active state S0. It is a matter of course that the digital still camera may, due to another activating factor such as the opening of the lens cap, transition from the suspend state S3 to the active state S0 in accordance with the method of activation by a hot boot.

As a result, it appears to the user as if activation was quickly done from the mechanical off state G3 with the depression of the power button or the like as a trigger.

As described above, the state of the digital still camera can be transitioned to a paused state or the active state S0 in accordance with a user's operation, and in the case of a transition from a paused state to the active state S0, it is possible to achieve quick transition, that is, quick activation.

In a case where, during a pause in the suspend state S3, activation has been performed without the battery 35 being detached by the user, activation is done by a hot boot. In a case where, during a pause in the suspend state S3, the user detached the battery 35 and attached it again, activation is done by a warm boot. Further, when entering into a pause in the hibernation S4, activation is done by a warm boot irrespective of whether the battery 35 is attached or detached. Therefore, from the user's perspective, the paused state appears as if it was a state with power turned off (mechanical off state G3).

As described above, in a case where a transition is made to the suspend state as a paused state, a resume can be performed from the suspend state. Further, in a case where, prior to entering the suspend state, the state is transitioned to the initial state of the active state in which execution of application processing is suppressed, and when a signal indicating an activating factor serving as an activation trigger is acquired, and activation is performed from the suspend state, the state is returned to the initial state, and the state is transitioned to an application execution state in which application processing corresponding to the activating factor is executed, faster activation can be achieved so that a state corresponding to a user's operation is attained.

Further, in a case where, prior to entering the suspend state, the state is transitioned to the initial state of the active state in which execution of application processing is suppressed, and when a signal indicating an activating factor serving as an activation trigger is acquired, and activation is performed from the suspend state, the state is returned to the initial state, and the state is transitioned to an application execution state in which application processing corresponding to the activating factor is executed, faster activation can be achieved so that a state corresponding to a user's operation is attained.

According to the above description, in a case where activation is done by a warm boot or cold boot, the state transitions to the initial state S0N. However, even in a case where activation is done by a warm boot or cold boot, the state may transition to, of the active state S0, a state in which processing corresponding to an activating factor is executed.

When transitioning from the suspend state S3 to the active state S0, that is, when activation by a hot boot is performed, loading of a warm-boot image, or loading of a program is not performed. Therefore, information (image) held in the SDRAM 29 is the same as the information held in the state immediately before the transition from the active state S0 to the suspend state S3.

However, when activation by a hot boot is repeated, the information held in the SDRAM 29 may be erroneously updated, or destructed, leading to malfunction of equipment.

For example, if there is a bug in an application program executed by the host CPU 11, a situation may arise in which although processing of an application program is terminated, the storage area of the SDRAM 29 that the application program has secured is not freed, so the available storage area within the SDRAM 29 decreases gradually. If this so-called memory leak occurs, after activation is done by a hot boot, the available storage area (memory capacity) within the SDRAM 29 may become short, making it difficult for the host CPU 11 to execute processing properly.

In view of this, according to the present invention, the available storage area within the SDRAM 29 immediately before a transition from the active state S0 to a paused state is checked, and if the memory usage rate of the SDRAM 29 is high, the suspend state S3 is not selected as the paused state to which a transition is to be made. Accordingly, if, for example, a memory leak occurs, at the time of next activation, data stored in the SDRAM 29 is refreshed due to the self-refresh function, and then a warm-boot image stored in the NAND-type flash memory 17 is loaded to the SDRAM 29. This makes it possible to prevent a situation where, for example, the available storage area within the SDRAM 29 becomes short and it becomes difficult for the host CPU 11 to execute processing properly. It should be noted that the storage area of the SDRAM 29 is called "heap", and managed by the kernel 71 of the operating system 61 executed by the host CPU 11.

Specifically, in the processing of step S502 in FIG. 23 or step S532 in FIG. 24, processing as shown in FIG. 27 is further executed.

Referring to a flow chart of FIG. 27, paused state determination processing will be described. As descried above, in the processing of step S502 (or step S532 in FIG. 24), if, for example, the output voltage of the battery 35 is equal to or higher than a predetermined threshold, and the power button of the input section 31 has been depressed, or if the output voltage of the battery 35 is equal to or higher than a predetermined threshold, and the lens cap has been closed, the paused state determination program 74 determines the paused state to which a transition is to be made to the suspend state S3. Further, if the output voltage of the battery 35 is less than a predetermined threshold, or if the power button has been depressed for a time longer than a predetermined time, the paused state determination program 74 determines the paused state to which a transition is to be made to the hibernation S4. After this determination is made, the processing shown in FIG. 27 is further executed by the host CPU 11.

In step S1001, the host CPU 11 executing the paused state determining program 74 of the operating system 61 checks "heap". It is thus detected how much storage area is currently being used.

In step S1002, the host CPU 11 calculates the memory usage rate on the basis of the processing result of step S1001. In this case, the memory usage rate is calculated as a value obtained by dividing the capacity of the storage area currently being used by the capacity of the total storage area of the SDRAM 29.

In step S1003, the host CPU 11 determines whether or not the memory usage rate calculated by the processing of step S1002 is equal to or higher than a preset threshold. If it is determined in step S1003 that the memory usage rate is equal to or higher than the threshold, the processing proceeds to step S1004.

In step S1004, the host CPU 11 sets the paused state to which a transition is to be made to the hibernation S4.

Accordingly, in step S503 in FIG. 23 or step S533 in FIG. 24, information indicating the hibernation S4 as paused state information is transmitted to the embedded controller 33 via the serial interface 19 by the host CPU 11 executing the paused state information providing program 75 of the operating system 61. In step S601 in FIG. 23 or step S631 in FIG. 24, this information is received by the embedded controller 33 executing the activation-method-determining-information acquiring program 203. In step S602 in FIG. 23 or step S632 in FIG. 24, the information indicating the hibernation S4 is stored as paused state information into the internal memory of the embedded controller 33. Accordingly, when the digital still camera is activated next time, the method of activation is determined to be the method of activation by a warm boot by the activation method determination program 122.

On the other hand, if it is determined in step S1003 that the memory usage rate is less than the threshold, the processing of step S1004 is skipped, so the previously determined paused state is maintained as it is. That is, in step S503 in FIG. 23 or step S533 in FIG. 24, information indicating the paused state (either the suspend state S3 or hibernation S4) determined in advance prior to the start of the processing of FIG. 27 is transmitted to the embedded controller 33 as paused state information.

In this way, when the memory usage rate has become equal to or higher than a preset threshold, the warm-boot image stored in the NAND-type flash memory 17 is loaded to the SDRAM 29, thus preventing a situation where, for example, the available storage area within the SDRAM 29 becomes short and it becomes difficult for the host CPU 11 to execute processing properly.

Alternatively, a configuration is also possible in which the memory usage rate in a state immediately prior to a transition from the active state S0 to a paused state is checked, and if the memory usage rate has become equal to or higher than a preset threshold, the method of activation to be used at the next activation is determined to be the method of activation by a warm boot.

In this case, for example, a configuration may be adopted in which activation-method specifying information specifying the method of activation to be used at the next activation is provided as information included in activation method information, the activation-method specifying information is transmitted together with paused state information, and in step S503 in FIG. 23 or step S533 in FIG. 24, the activation-method specifying information is transmitted together with paused state information to the embedded controller 33 and stored. Then, when the digital still camera is activated next time, it is determined by the activation method determination program 122 whether or not the activation-method specifying information is included in the activation method information, and if it is determined that the activation-method specifying information is included in the activation method information, the method of activation is determined to be the method of activation by a warm boot.

In this case as well, if, for example, a memory leak occurs, when activation is performed next time, the warm-boot image stored in the NAND-type flash memory 17 is loaded to the SDRAM 29, thus preventing a situation where, for example, the available storage area within the SDRAM 29 becomes short and it becomes difficult for the host CPU 11 to execute processing properly.

The above description is directed to a case where, if activation-method specifying information is included in activation method information, the method of activation used when activation is performed next time is determined to be the method of activation by a warm boot. However, a configuration is also possible in which, for example, if activation-method specifying information is included, the method of activation used when activation is performed next time is determined to be the method of activation by a cold boot.

In this case as well, if, for example, a memory leak occurs, at the time of next activation, data stored in the SDRAM 29 is refreshed due to the self-refresh function, and then a warm-boot image stored in the NAND-type flash memory 17 is loaded to the SDRAM 29, thus preventing a situation where, for example, the available storage area within the SDRAM 29 becomes short and it becomes difficult for the host CPU 11 to execute processing properly.

It should be noted that the present invention is applicable not only to a digital still camera but also to a digital video camera, a portable telephone, or a portable player, or various kinds of stationary equipment such as an HDD recorder player or a television receiver.

The series of processing described above can be executed by hardware or can be executed by software. If the series of processing is to be executed by software, a program constituting that software is installed from a program-recording medium into a computer incorporated in dedicated hardware, or into, for example, a general-purpose personal computer which is capable of executing various kinds of function with various kinds of program installed therein.

The program to be executed by the computer (the host CPU 11, the real-time CPU 12, or the embedded controller 33) is provided by being recorded in a removable medium as a package medium such as a magnetic disk (including a flexible disk), an optical disk (CD-ROM (Compact Disc-Read Only Memory), a DVD (Digital Versatile Disc), or the like), a magneto-optical disk, or a semiconductor memory, or via a wired or wireless transmission medium such as the local area network, the Internet, or digital satellite broadcasting.

Further, a program can be installed by storing the program into the NAND-type flash memory 17 via the IDE interface 28, by mounting a removable medium to a drive connected to the IDE interface 28. Further, a program can be installed by receiving the program by the wireless LAN interface 24 via a wireless transmission medium, or by receiving the program by the general-purpose input/output section 32 via a wired transmission medium, and storing the program into the NAND-type flash memory 17. Alternatively, a program can be installed in advance by storing the program into the NAND-type flash memory 17 in advance.

It should be noted that the program executed by the computer may be a program in which processes are performed time sequentially in the order as described in this specification, or may be a program in which processes are performed in parallel or at required timing such as when the processes are called.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus which transitions from an active state, in which processing according to an application program is executed, to a paused state due to a predetermined trigger, and transitions from the paused state to the active state due to another trigger different from the predetermined trigger, comprising:
   usage rate calculating means for calculating a usage rate of a main memory, when transition is made from the active state to the paused state;
   paused state selecting means for selecting a paused state to which transition is to be made from among a plurality of kinds of the paused state, on the basis of a usage rate of the main memory calculated by the usage rate calculating means; and
   paused state transition means for transitioning itself to a paused state selected by the paused state selecting means,
   wherein:
   the plurality of kinds of the paused state include at least a first paused state and a second paused state;
   in the first paused state, supply of power to a processor is stopped, and supply of power to the main memory is performed; and in the second paused state, supply of power to the processor is stopped, and supply of power to the main memory is stopped, and wherein the usage rate calculating means calculates the usage rate of the main memory by dividing a capacity of the main memory currently being used by a total capacity of the main memory, and determines whether the calculated usage rate of the main memory is equal to or higher than a preset threshold, and if the calculated usage rate of the main memory is equal to or higher than the preset threshold, the paused state selecting means selects the second paused state as a paused state to which transition is to be made.

2. The information processing apparatus according to claim 1, wherein when transition is made from the second paused state to the active state due to the other trigger, data corresponding to software executed by the processor in the active state is loaded to the main memory again.

3. The information processing apparatus according to claim 1, further comprising storage means for storing preset data irrespective of presence/absence of supply of power, wherein when transition is made from the second paused state to the active state due to the other trigger, data corresponding to a memory image of the main memory in the active state stored in the storage means is loaded to the main memory.

4. The information processing apparatus according to claim 1, in which the information processing apparatus is arranged within a digital still camera having an image sensor device.

5. An information processing method for an information processing apparatus which transitions from an active state, in which processing according to an application program is executed, to a paused state due to a predetermined trigger, and transitions from the paused state to the active state due to another trigger different from the predetermined trigger, comprising the steps of:

calculating a usage rate of a main memory, when transition is made from the active state to the paused state;

selecting a paused state to which transition is to be made from among a plurality of kinds of the paused state, on the basis of the calculated usage rate of the main memory; and transitioning itself to the selected paused state, wherein:

the plurality of kinds of the paused state include at least a first paused state and a second paused state;

in the first paused state, supply of power to a processor is stopped, and supply of power to the main memory is performed; and in the second paused state, supply of power to the processor is stopped, and supply of power to the main memory is stopped, and wherein the usage rate of the main memory is calculated by dividing a capacity of the main memory currently being used by a total capacity of the main memory, and a determination is performed as to whether the calculated usage rate of the main memory is equal to or higher than a preset threshold, and if the calculated usage rate of the main memory is equal to or higher than the preset threshold, the second paused state is selected as a paused state to which transition is to be made.

6. A computer readable recording medium having stored thereon a program for an information processing apparatus which transitions from an active state, in which processing according to an application program is executed, to a paused state due to a predetermined trigger, and transitions from the paused state to the active state due to another trigger different from the predetermined trigger, the program being readable by a computer, comprising the steps of:

controlling calculation of a usage rate of a main memory, when transition is made from the active state to the paused state;

controlling selection of a paused state to which transition is to be made from among a plurality of kinds of the paused state, on the basis of the calculated usage rate of the main memory; and controlling itself so as to transition to the selected paused state, wherein:

the plurality of kinds of the paused state include at least a first paused state and a second paused state;

in the first paused state, supply of power to a processor is stopped, and supply of power to the main memory is performed; and in the second paused state, supply of power to the processor is stopped, and supply of power to the main memory is stopped, and wherein the usage rate of the main memory is calculated by dividing a capacity of the main memory currently being used by a total capacity of the main memory, and a determination is performed as to whether the calculated usage rate of the main memory is equal to or higher than a preset threshold, and if the calculated usage rate of the main memory is equal to or higher than the preset threshold, the second paused state is selected as a paused state to which transition is to be made.

7. An information processing apparatus which transitions from an active state, in which processing according to an application program is executed, to a paused state due to a predetermined trigger, and transitions from the paused state to the active state due to another trigger different from the predetermined trigger, comprising:

a usage rate calculating section calculating a usage rate of a main memory, when transition is made from the active state to the paused state;

a paused state selecting section selecting a paused state to which transition is to be made from among a plurality of kinds of the paused state, on the basis of a usage rate of the main memory calculated by the usage rate calculating section; and a paused state transition section transitioning itself to a paused state selected by the paused state selecting section, wherein:

the plurality of kinds of the paused state include at least a first paused state and a second paused state;

in the first paused state, supply of power to a processor is stopped, and supply of power to the main memory is performed; and in the second paused state, supply of power to the processor is stopped, and supply of power to the main memory is stopped, and wherein the usage rate calculating section calculates the usage rate of the main memory by dividing a capacity of the main memory currently being used by a total capacity of the main memory, and determines whether the calculated usage rate of the main memory is equal to or higher than a preset threshold, and if the calculated usage rate of the main memory is equal to or higher than the preset threshold, the paused state selecting means selects the second paused state as a paused state to which transition is to be made.

* * * * *